(12) United States Patent
Watase et al.

(10) Patent No.: US 7,279,218 B2
(45) Date of Patent: Oct. 9, 2007

(54) COATED BODY HAVING EXCELLENT THERMAL RADIATION PROPERTY USED FOR MEMBERS OF ELECTRONIC DEVICE

(75) Inventors: Takeshi Watase, Kakogawa (JP); Yasuo Hirano, Kobe (JP); Kazuo Okumura, Kakogawa (JP); Tetsuya Yamamoto, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 345 days.

(21) Appl. No.: 10/762,460

(22) Filed: Jan. 23, 2004

(65) Prior Publication Data

US 2005/0163983 A1    Jul. 28, 2005

(51) Int. Cl.
*B32B 7/02* (2006.01)
*B32B 27/32* (2006.01)

(52) U.S. Cl. ............... 428/212; 428/220; 428/213; 428/203; 219/200; 219/543; 361/704

(58) Field of Classification Search ............... 428/212, 428/220, 213, 203; 219/200, 543; 361/704
See application file for complete search history.

(56) References Cited

U.S. PATENT DOCUMENTS

| | | | | |
|---|---|---|---|---|
| 3,999,040 A | * | 12/1976 | Ellis | ............... 219/543 |
| 5,221,575 A | | 6/1993 | Nakano et al. | |
| 6,926,861 B2 | * | 8/2005 | Hirayama et al. | ............ 419/49 |
| 7,009,284 B2 | * | 3/2006 | Nakase et al. | ............... 257/675 |

FOREIGN PATENT DOCUMENTS

| | | |
|---|---|---|
| JP | 57-78463 | 5/1982 |
| JP | 60-4569 | 1/1985 |
| JP | 64-60668 | 3/1989 |
| JP | 4-71236 | 6/1992 |
| JP | 2001-341229 | 12/2001 |

OTHER PUBLICATIONS

Research and Development, Kobe Steel Engineering Reports, vol. 52, No. 2, Sep. 2002, pp. 107 and 110.
Kobelco; Pamphlet of our chromate-free coated steel sheet having thermal radiation property, 2002.

* cited by examiner

*Primary Examiner*—Rena Dye
*Assistant Examiner*—Lawrence Ferguson
(74) *Attorney, Agent, or Firm*—Oblon, Spivak, McClelland, Maier & Neustadt, P.C.

(57) ABSTRACT

Disclosed is a coated body for members of an electronic device, comprising a substrate covered, on the surface side and back side thereof, with respective thermal radiative coatings having thermal radiation property, wherein a difference $\Delta T1$ $(=T1_B-T1_A)$ between Temperature $T1_A$, at Position T1, of the coated body used as a sample and Temperature $T1_B$, at Position T2, of the substrate not covered with a coating used as another sample is 1.5° C. or greater, said temperatures being measured using a thermal radiation property evaluating apparatus illustrated in FIG. 1; and whereby satisfying its essential properties (maintenance of air tightness to block water or dust and reduction in size and weight), while reducing the temperature inside of the members of an electronic device (thermal radiation property).

37 Claims, 14 Drawing Sheets

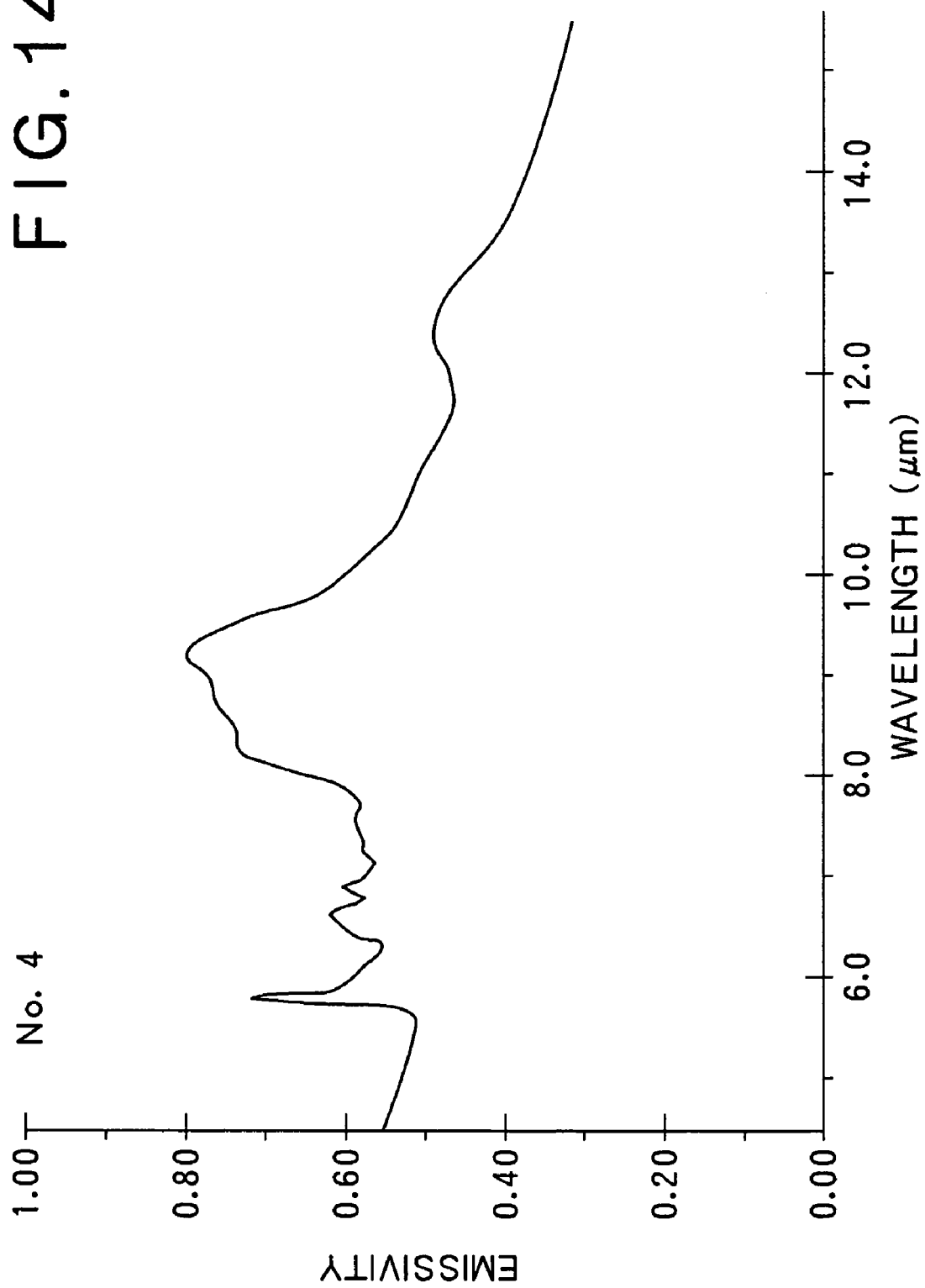

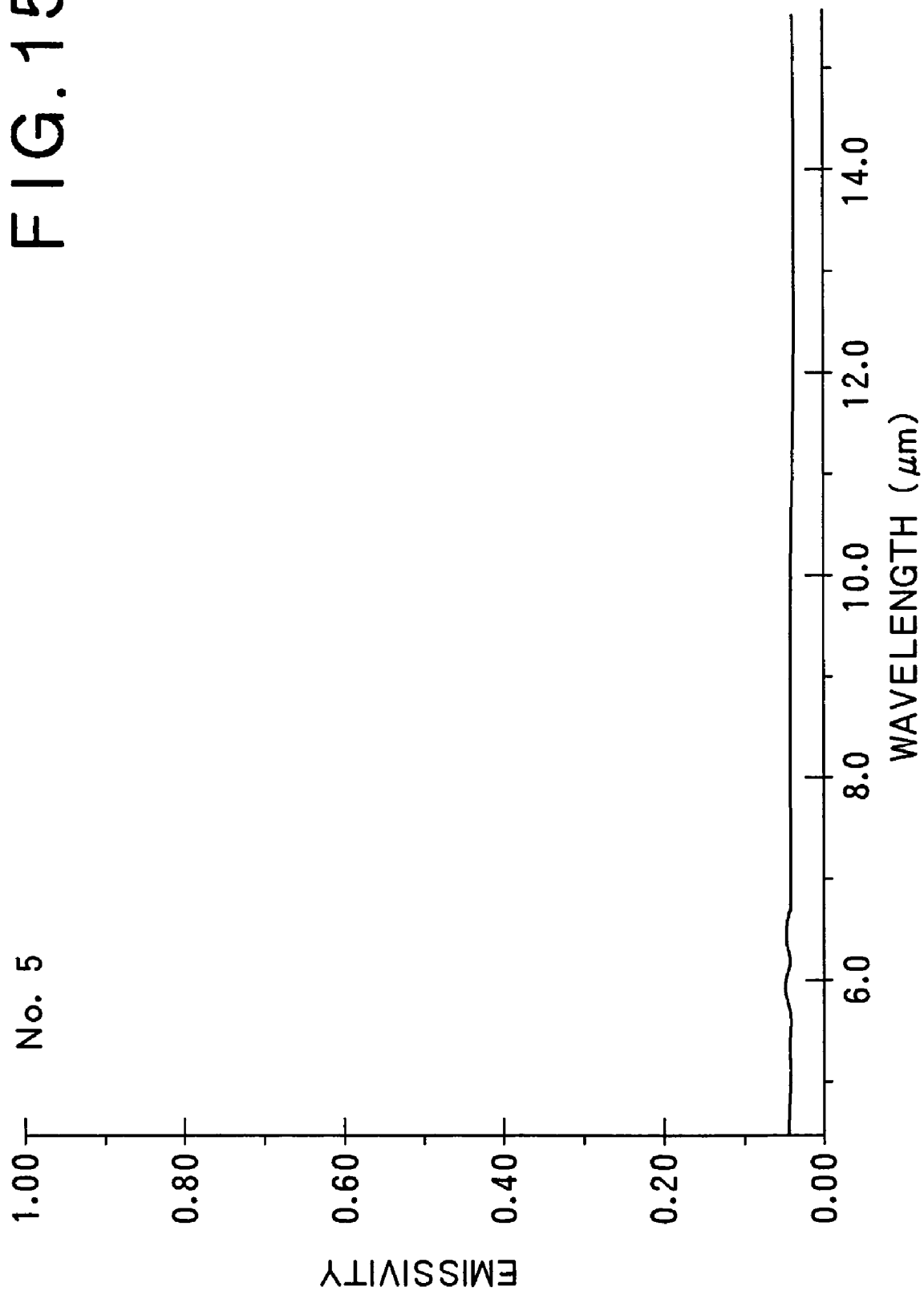

COATED BODY HAVING EXCELLENT THERMAL RADIATION PROPERTY USED FOR MEMBERS OF ELECTRONIC DEVICE

BACKGROUND OF THE INVENTION

1. Field of the Invention

The present invention relates to a coated body for members of an electronic device, which coated body is useful as a cabinet of an electronic, electrical or optical device (which may hereinafter be represented by "electronic device") and excellent in thermal radiation property; a coated body for members of an electronic device, which coated body is excellent in thermal radiation property and self cooling property; the above-described coated body for members of an electronic device, which coated body is also excellent in electric conductivity; parts for an electronic device excellent in such properties; a coating composition useful for the formation of a coated body excellent in thermal radiation property and electric conductivity; and an apparatus for evaluating the thermal radiation property of a coated body. Since the coated body of the present invention contains a blackening additive such as carbon black in a proper amount and has a proper coat thickness, it is excellent in thermal radiation property. It can therefore be suited for use in the products of digital information recording and/or processing products such as CD, LD, DVD, CD-ROM, CD-RAM, PDP and LCD and the products of electric, electronic and communication related fields such as personal computers, car navigation systems and car AV. Moreover, they are usable as cabinets for various electronic devices, for example, audio-video instruments such as projector, television, video and game machine, copying machine, printer, power supply box cover of air conditioner outdoor unit, control box cover, automatic vending machine and refrigerator.

The coated body of the present invention can also be used as a chromate-free coated body which does not contain harmful hexavalent chromium at all. The chromate-free coated body provided by the present invention is very useful, because it has corrosion resistance and adhesion of coating comparable to those of a chromated steal sheet and in addition, has good formability.

2. Description of the Related Art

With a recent tendency to enhanced performance and miniaturization of electronic, electrical or optical devices, heat released amount inside of the chassis of an electronic device or the like increases, causing problems such as temperature increase of the device itself (temperature increase inside of the electronic device). The temperature inside an electronic device is usually about 40 to 70° C. under normal atmospheric temperature, which happens to become about as high as 100° C. at the maximum. It has been pointed out that stable operation is disturbed by such a temperature increase exceeding the heat resistant temperature of IC, CPU (semiconductor device), disk or motor. When a temperature rises further, a semiconductor element is destroyed and gets out of order or the life of the parts of an electronic device becomes short.

As a heat releasing means for reducing the inside temperature of an electronic device (for radiating heat from an electronic device), proposed is a method of attaching a heat releasing part such as heat sink or heat pipe to the cabinet of the electronic device (to the cabinet itself, frame, shield case, back panel of liquid crystals or the like). This method is effective only for diffusing the heat released from the heat source (heating element) of an electronic device within the whole cabinet. Particularly in the case where the cabinet has a small capacity, desired heat releasing effect is not available. Moreover, it is accompanied with such inconveniences that it takes time to attach such a heat releasing part to an electronic device, an extra space is necessary for attachment, and it heightens the production cost. This method is therefore unsuited for use in electronic devices which tend to be smaller in size and lower in production cost.

Also proposed is a method of releasing heat from the cabinet of an electronic device made of a metal plate by perforating the metal plate and making use of convection caused by a fan installed to the metal plate. Since electronic devices are apt to be damaged by water or dust, such a device cannot be applied to every purpose. Moreover, it has similar problems to those of the above-described heat sink such as cost rise, and extra time and space derived from attachment of the fan.

There is accordingly an eager demand for the provision of a novel cabinet for an electronic device which can satisfy the original performances required for the electronic device (such as maintenance of air tightness in order to protect the device from water and dust, smaller size and lighter weight), while attaining a reduction in the temperature inside of the electronic device (thermal radiation property).

The cabinet of an electronic device is, in addition to the thermal radiation property, required to control a temperature rise of the cabinet itself, because this makes it possible to prevent users who touch the cabinet from getting burned during operation of the electronic device. Thus, safe products can be provided if a temperature rise of the cabinet can be suppressed. This "property to suppress a temperature rise of the cabinet itself of an electronic device" is especially called, in the present invention, "self cooling property" to distinguish it from the above-described "thermal radiation property". The above-described heat releasing countermeasures (for example, a method of attaching a heat releasing part such as heat sink or heat pipe or a method of perforating a metal plate and installing a fan) are insufficient for obtaining a cabinet excellent in both of these properties. There is accordingly an eager demand for provision of a cabinet having both properties.

The cabinet of an electronic device is required, in addition to the above-described properties, to have excellent electric conductivity. A conventional steel plate coated into black color (a steel plate covered with a black coating) is accompanied with such a problem that an electric resistance becomes high owing to an excessively thick black coating and desired earth cannot be secured when it is applied to an electronic device.

With respect to the substrate, on the other hand, substrates are conventionally chromated in order to impart them with corrosion resistance and improve adhesion of coating, but environmental pollution brought by the use of a large amount of harmful hexavalent chromium is becoming a serious problem. There is therefore a demand for the replacement of the harmful chromate treatment with non-chromate treatment which does not contain chromium. It is however known that substrates without chromate treatment are inferior in corrosion resistance and adhesion of coating, and, formability. There is accordingly an eager demand for the provision of a chromate-free coated body usable as a cabinet for the members of an electronic device, which coated body is excellent in corrosion resistance, adhesion of coating and formability, and in addition, is excellent in thermal radiation property and self cooling property.

SUMMARY OF THE INVENTION

With the foregoing circumstances in view, the present invention has been made. An object of the present invention is to provide a novel coated body usable as the cabinet of an electronic device, which coated body can satisfy the essential characteristics required for the members of an electronic device (such as maintenance of air tightness in order to protect the device from water and dust, smaller size and lighter weight), while attaining a reduction in the temperature inside of the electronic device (thermal radiation property); a coated body for the members of an electronic device excellent in, in addition to the above-described properties, a property (self cooling property) to suppress a temperature increase of the coated body itself; a coated body for the members of an electronic device, having, in addition, excellent electric conductivity; a chromate-free coated body for the members of an electronic device, which coated body is excellent in corrosion resistance and adhesion of coating and has good formability; parts of an electronic device covered with a coated body having such excellent properties; a coating composition useful for forming a coated body excellent in thermal radiation property and electric conductivity; a coating composition which is to be applied to a substrate subjected to chromate-free surface treatment and has excellent thermal radiation property, electric conductivity, corrosion resistance, adhesion of coating, and formability; and a thermal radiation property evaluating apparatus for evaluating the thermal radiation property of a test piece.

The coated body which has succeeded in overcoming the above-described problems and is excellent in thermal radiation property (such coated body may hereinafter be called "first coated body") is characterized by that it has a substrate covered, on the surface side and back side thereof, with respective thermal radiative coatings having thermal radiation property and satisfies the below-described property (I) or (II) as an index of "excellent thermal radiation property".

(I) Integrated emissivities, at infrared wavelength (4.5 to 15.4 µm) when the above-described coated body is heated to 100° C. satisfy the following equation (1):

$$a \times b \geq 0.42 \quad (1)$$

wherein, a: infrared integrated emissivity from the surface side of the substrate covered with one of said respective thermal radiative coatings, and b: infrared integrated emissivity from the back side of the substrate covered with the other one of said respective thermal radiative films; and more preferably, $a \geq 0.65$ and/or $b \geq 0.65$, and/or a difference (A−B) between the maximum value A and the minimum value B of spectral emissivity in a wavelength region of 4.5 to 15.4 µm is 0.35 or less.

Such a coated body excellent in thermal radiation property has, as a specific constitution, a substrate covered, on the surface side and back side thereof, with respective thermal radiative coatings, wherein at least one of the thermal radiative coatings contains a blackening additive and satisfies the following equation (2):

$$(X-3) \times (Y-0.5) \geq 15 \quad (2)$$

wherein, X represents the content (mass %) of the blackening additive contained in the thermal radiative coating, and Y represents thickness (µm) of the thermal radiative coating.

The above-described coated body has better thermal radiation property when X (the content of the blackening additive contained in the thermal radiative coating) satisfies the equation: $4 \leq X < 15$ [Equation (3)]; Y (thickness of the thermal radiative coating) satisfies the equation: $Y > 1$ µm; the blackening additive has an average particle size of 5 to 100 nm; or the blackening additive is carbon black.

The coated body which has succeeded in overcoming the above-described problems and is "excellent in thermal radiation property and self cooling property" (which may hereinafter be called "second coated body") is characterized by that it has a substrate covered, on the surface side and back side thereof, with respective coatings and at least the coating on the back side is a thermal radiative coating having thermal radiation property:

it satisfies the below-described (II) as an index of "excellent self cooling property" and (III) as an index of "good thermal radiation property in the second coated body.

(II) The integrated emissivities at infrared wavelength (4.5 to 15.4 µm) when the coated body is heated at 100° C. satisfy the following equation (4):

$$b \leq 0.9 \, (a-0.05) \quad (4)$$

(III) The integrated emissivities at infrared wavelength (4.5 to 15.4 µm) when the coated body is heated at 100° C. satisfy the following equation (5):

$$(a-0.05) \times (b-0.05) \geq 0.08 \quad (5)$$

wherein, a: infrared integrated emissivity from the surface side of the substrate covered with one of said respective thermal radiative coatings, and b: infrared integrated emissivity from the back side of the substrate covered with the other one of said respective thermal radiative films.

A specific constitution to attain such a coated body excellent in "thermal radiation property and self cooling property" is characterized in that the substrate is covered, on the surface side and back side thereof, with coatings, at least said coating on the surface side being a thermal radiative coating having thermal radiation property, and that the thermal radiative coating contains a blackening additive and satisfies the following equation (6):

$$(X-3) \times (Y-0.5) \geq 3 \quad (6)$$

wherein, X represents the content (mass %) of the blackening additive contained in the thermal radiative coating, and Y represents thickness (µm) of the coating.

The above-described coated body has better properties and is therefore useful when X (the content of the blackening additive contained in the thermal radiative coating) satisfies: $4 \leq X < 15$ [Equation (7)]: Y (thickness of the coating) satisfies: $Y > 1$ µm; the blackening additive has an average particle size of 5 to 100 nm; or the blackening additive is carbon black.

The coated body which has succeeded in overcoming the above-described problems and is "excellent in thermal radiation property (moreover, self cooling property) and electric conductivity" (which coated body may hereinafter be called "third coated body") is characterized by that it has the above-described properties and its electric resistance satisfies 100Ω or less. More specifically, the thermal radiative coating contains a conductive filler (preferably, Ni).

The above-described coated body of the present invention (any one of the first to third coated bodies) has improved corrosion resistance and is therefore preferred, when a non-hydrophilic resin (preferably, a polyester resin) is used as a resin for forming the thermal radiative coating.

The coated body of the present invention having a thermal radiative coating covered with a transparent coating has improved scratch resistance and fingerprint resistance so that it is useful.

The coated body of the present invention embraces a chromate-free coated body. In a preferred embodiment, the above-described substrate is a metal sheet subjected to chromate-free surface treatment and the thermal radiative coating contains an antirust agent further. Described specifically, it is recommended to incorporate, in the above-described thermal radiative coating, an epoxy-modified polyester resin and/or a polyester resin having a phenol derivative introduced in the main chain thereof and a crosslinking agent (preferably an isocyanate resin and/or a melamine resin, more preferably both used in combination). Addition of these components makes it possible to maintain excellent corrosion resistance [an area ratio of a deteriorated portion in the salt spray test (72 hours) for testing corrosion resistance according to JIS-Z-2371: 10% or less], excellent adhesion of coating (evaluated by the portion of the coating which is peeled off when the tape applied on the bent portion is removed), and excellent formability (the number of cracks in the bend adhesion test as specified in JIS K 5400: 5 or less). A double-layer coating having the above-described coating and another coating applied thereto is very useful, because such a constitution enables to prevent the elution of an antirust agent and therefore, to improve the corrosion resistance further [an area ratio of a deteriorated portion in the salt spray test (120 hours) for testing corrosion resistance according to JIS-Z-2371: 10% or less]. Application of, to the above-described coating, a transparent coating as another coating can improve the scratch resistance and anti-fingerprint resistance further.

Addition of a conductive filler (preferably Ni) to the above-described coating enables to impart it with excellent electric conductivity (electric resistance of 100Ω or less). Although the addition of the conductive filler into the coating lowers corrosion resistance, it is possible to maintain good corrosion resistance by controlling the film thickness of at least the coating formed on the surface side of the coatings formed on both sides to 2 μm or more.

The coating composition for the members of an electronic device according to the present invention, which has succeeded in overcoming the above-described problems, is characterized by that it contains a film forming component and, based thereon, 3 mass % or greater of a blackening additive and 10 to 50 mass % of a conductive filler. Use of such a coating composition makes it possible to form a coating excellent in thermal radiation property and electric conductivity. Preferred are the coating compositions in which the blackening additive has an average particle size of 5 to 100 nm, the blackening additive is carbon black, and the conductive filler is Ni, respectively.

A coating composition which is the members of an electronic device, is to be applied to a substrate subjected to chromate-free surface treatment and comprises at least 35 parts by weight of an epoxy-modified polyester resin and/or a polyester resin having a phenol derivative introduced in the main chain thereof, 2 to 25 parts by weight of an antirust agent, 1 to 20 parts by weight of a crosslinking agent, over 3 parts by weight of a blackening additive and 10 to 50 parts by weight of a conductive filler is also braced in the present invention. The crosslinking agent preferably contains a melamine resin in an amount of 5 to 80 parts by weight based on 100 parts by weight of an isocyanate resin. The blackening additive has an average particle size of from 5 to 100 nm and use of carbon black is recommended. As the conductive filler, use of Ni is preferred. The chromate-free coating having excellent thermal radiation property, electric conductivity, corrosion resistance, adhesion of coating and formability can be formed by using the coating composition satisfying the above-described compositions.

The present invention also embraces parts of an electronic device having, in a closed space thereof, a heating element, and having a cabinet wall composed wholly or partially of the above-described coated body for the members of an electronic device according to the present invention (examples of the parts include information recording products such as CD, LD, DVD, CD-ROM, CD-RAM, PDP and LCD, electric, electronic and communication related products such as personal computer, car navigation system and car audio-video, audio-video apparatuses such as projector, television, video and game machine, copying machines, printers, power supply box covers for air conditioner outdoor unit, control box covers, automatic vending machines and refrigerators.

The present invention also embraces a thermal radiation property evaluating apparatus for evaluating the radiation property of a test plate, which comprises a cabinet having a ceiling surface made partially or wholly of said test plate, and side and bottom surfaces made of a heat insulating material; a heating element disposed on the bottom surface of the cabinet; and a thermometer disposed on the substantial center inside of the cabinet. The thermal radiation property evaluating apparatus having, above the test plate, a protective member for blocking it from the outside air conditions is very useful, because it can protect the test plate from factors (outside air or air from an air conditioner) presumably having an adverse effect on the thermal radiation property and therefore, can evaluate thermal radiation property stably.

Other and further objects, features and advantages of the invention will appear more fully from the following description.

BRIEF DESCRIPTION OF THE DRAWINGS

FIG. 14 is a graph showing the relationship between the infrared wavelength and emissivity of Sample No. 3 in Example 2; and FIG. 15 is a graph showing the relationship between the infrared wavelength and emissivity of Sample No. 4 in Example 2.

DETAILED DESCRIPTION OF THE PREFERRED EMBODIMENTS

Figure 1:
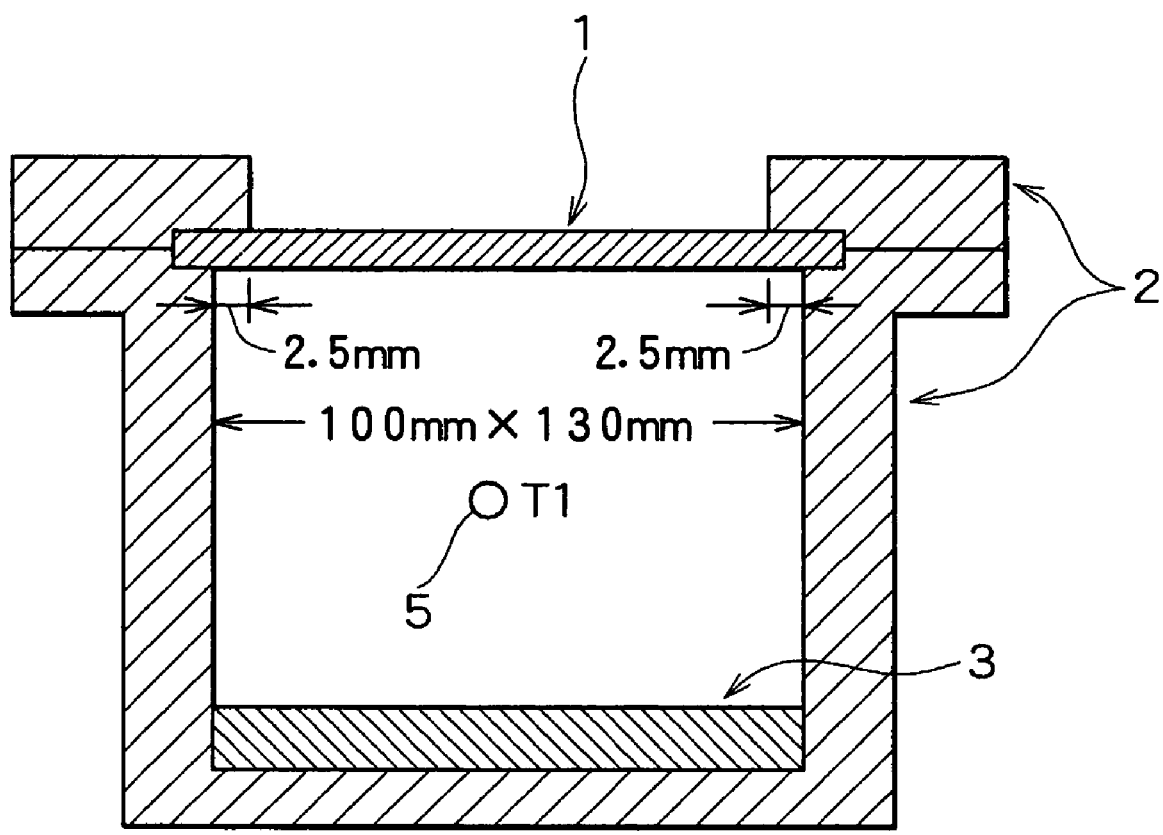
FIG. 1 is a schematic view of an apparatus used for evaluating ΔT1 (thermal radiation property) and ΔT2 (self cooling property of the coated body of the present invention.

The coated body for the members of an electronic device according to the present invention embraces the below-described modes [A] to [C]:

[A] a coated body for the members of an electronic device excellent in thermal radiation property (first coated body),

[B] a coated body for the members of an electronic device excellent in thermal radiation property and self cooling property (second coated body), and

[C] the coated body of [A] or [B], further having improved electric conductivity (third coated body).

The basic concept common to the above-described coated bodies [A] to [C] will next be described.

The present inventors have carried out an extensive investigation with a view toward providing a novel coated body for the members of an electronic device, which coated body is capable of satisfying the essential properties required for electronic devices (such as maintenance of air tightness to protect them from water or dust, reduction in size, weight or cost, and the like) while lowering the temperature inside of the electronic devices (thermal radiation property), particularly, with a focus on improvement in the thermal radiation property of the coated body itself. As a result, they have found that the desired objects can be attained by covering the surface side and back side of a substrate with predetermined coatings.

The present invention is based on the mechanism of "the heat (radiant heat) released from a heating source (heating element) inside of an electronic device is absorbed (emitted) by a coating formed on the back side and then released from the thermal radiative film on the surface side". One of the great characteristics of the present invention resides in the successful application of a so-called "heat transfer system" to members of an electronic device. A coated body to which such a concept of "heat transfer system" has been applied to cause a heat released from an electronic device to absorb in "the back side of a substrate" and then, to emit it to "the surface of the substrate" has not been known yet and is novel.

Prior to description of each coated body, the relationship between the first coated body (excellent in thermal radiation property) and the second coated body (excellent in both thermal radiation property and self cooling property) will be described.

Between the first coated body and the second coated body, there is no difference in a basic concept of applying the above-described idea of "heat transfer" to members of an electronic device, thereby improving its thermal radiation property. They however differ in the problem to be ultimately solved (main problem), and technical concept and constitution for overcoming the problem. The main problem to be solved in the first coated body is improvement of thermal radiation property (lowering of the temperature inside of an electronic device). The thermal radiative coatings on both sides of a substrate is regarded as one constituent and they are specified based on the concept of "the higher the product of the infrared emissivities on the surface side and the back side, the better". The main problem to be solved in the second coated body is, on the other hand, suppression of a temperature increase of the coated body itself while maintaining the thermal radiation property to some extent by making use of the above-described concept of "heat transfer". Based on the concept that "heat absorbed in the coated body is released by positively differentiating the infrared emissivity on the surface side from that on the back side and setting the infrared emissivity on the back side lower than that on the surface side, while setting the infrared emissivity on the surface side as high as possible", the constitutions of these coatings are controlled separately. Thus, these first and second coated bodies may be different in destination.

Figure 2:
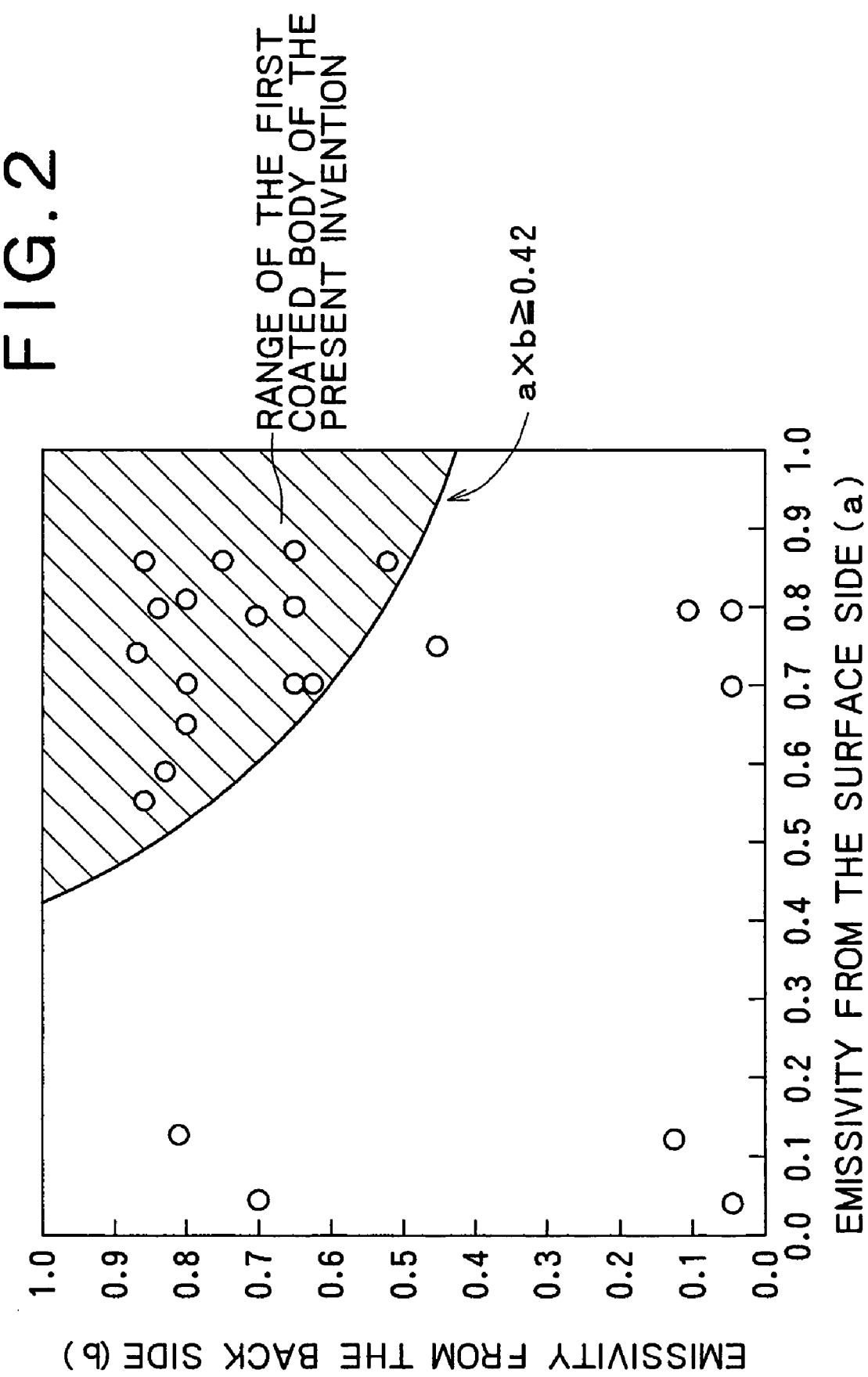
FIG. 2 is a graph showing a range of thermal radiation property (a×b) of the first coated body according to the present invention.
Figure 3:
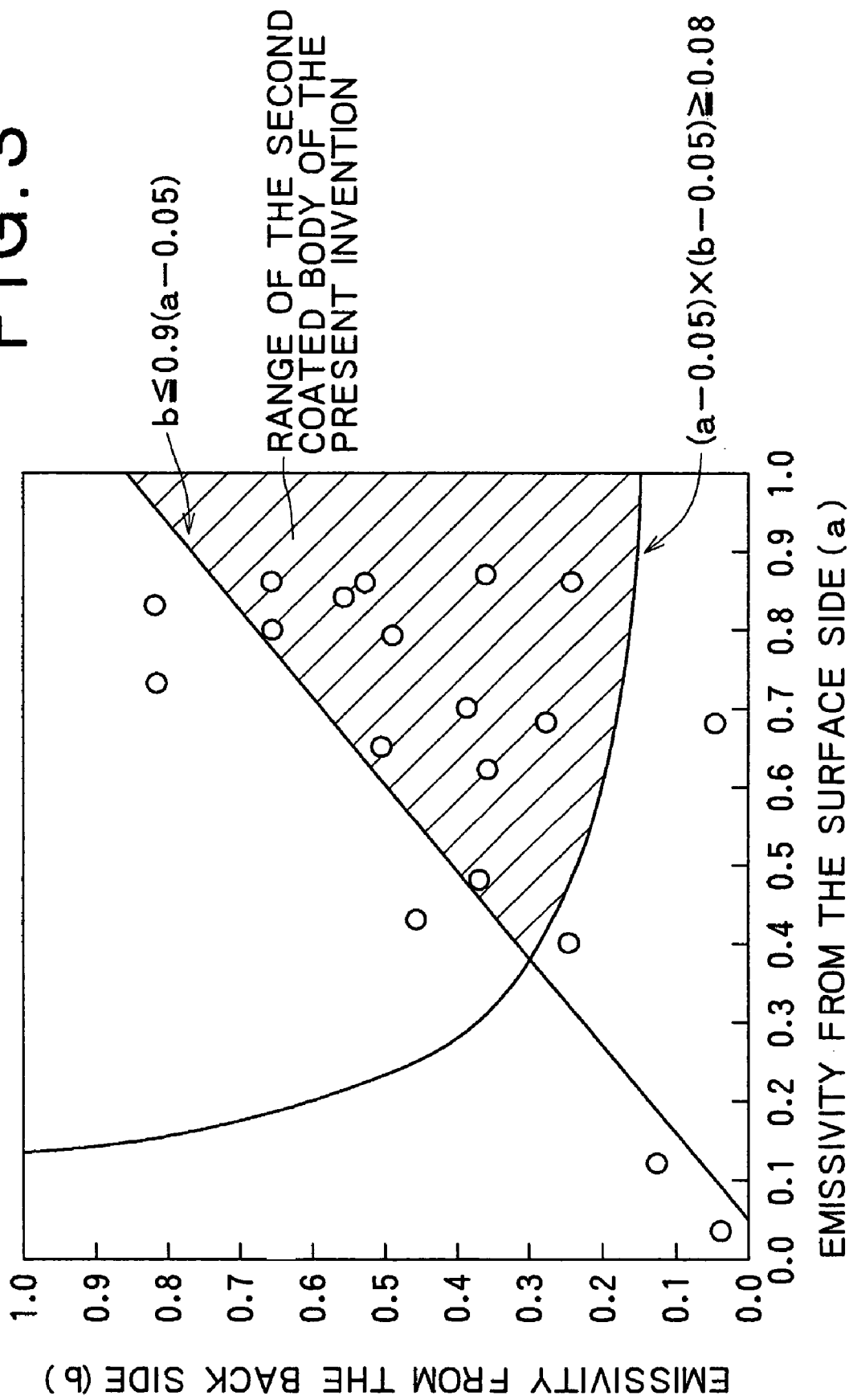
FIG. 3 is a graph showing a range of the second coated body of the present invention excellent in both self cooling property and thermal radiation property.

Described specifically, the first coated body embraces a coated body which is excellent in thermal radiation property but inferior in self cooling property. The second coated body, on the other hand, embraces a coated body which is excellent in self cooling property but a little inferior in thermal radiation property to the first coated body. Such a difference between them can be understood clearly from FIG. 2 which shows a range defined by the first coated body [a range satisfying the above-described equation (1) and is therefore excellent in thermal radiation property] and FIG. 3 which shows a range defined by the second coated body [an overlapping portion of a range which satisfies the above-described equation (5) and is therefore excellent in thermal radiation property and a range which satisfies the above-described equation (4) and is therefore excellent in self cooling property]. These coated bodies embrace an overlapping portion of their ranges [a range which is excellent in thermal radiation property because the product of the infrared thermal emissivities from the surface side and back side is high and at the same time, is excellent in self cooling property because the infrared emissivity on the surface is higher than that on the back side] and in this portion, both the thermal radiation property and self cooling property are markedly excellent.

Each coated body of the present invention will next be described.

[A] Coated Body for Members of an Electronic Device Excellent in Thermal Radiation Property (First Coated Body)

The first coated body is developed based on the above-described basic concept. It has been found that the desired object is attained by covering the surface side and back side of a substrate with a predetermined thermal radiative coating, leading to the completion.

The technical concept of the first coated body resides in that excellent thermal radiation property is attained by using, as a coated body for members of an electronic device, a coated body having a substrate covered, on the surface side and back side thereof [in the present invention, the side of a substrate exposed to the outside air viewed from the coated body is called "surface side", while the inside of the coated body is called "the back side"], with thermal radiative coatings whose integrated emissivities at any infrared region (wavelength: 4.5 to 15.4 μm) (which may hereinafter be called "infrared integrated emissivity" or "infrared emissivity", simply) satisfy a predetermined range.

Examples of the conventional coated body include a post-coated material which is coated after processing such as press processing and pre-coated material which is coated prior to processing. Since these coating materials are not developed based on the idea of "adopting the concept of heat transfer system for improving thermal radiation property upon application of them to the cabinet of an electronic device", thermal radiative coatings having predetermined thermal radiation property have not been formed on both sides of a substrate. As a matter of fact, these conventional coated bodies have an outer surface (surface) coated for improving their design or functionality (corrosion resistance), but their thermal radiation property is low. Their back side (inside surface of the coated bodies) is not coated or, if any, coated to maintain the minimum corrosion resistance (so, desired thermal radiation property cannot be attained). It has been confirmed by Examples which will be described later that desired thermal radiation property is not available by such a one-side coated body.

The above-described coated body will next be described specifically.

The first coated body has a substrate covered, on the surface side and back side thereof, with respective thermal radiative coatings. It satisfies, as an index of its "excellent thermal radiation property", $\Delta T1$ (difference in the inside temperature of an electronic device) represented by the below-described equation (I) or "a×b" (product of infrared emissivities from the surface side and back side of the coated body) represented by the below-described equation (II).

Of these, "a×b" is the product of the emissivities of infrared waves emitted from the coated body and is useful as an index showing the thermal radiation effect of the coated body. On the other hand, $\Delta T1$ means thermal radiation effect of the coated body when used as the member of an electronic device under simulated practical conditions. It is adopted in the present invention, because it permits evaluation of thermal radiation property at the atmospheric temperature (atmospheric temperature differs, depending on the kind of an electronic device, but is usually 50 to 70° C., about 100° C. at the maximum) which can be assumed from the above-described application.

Figure 4:
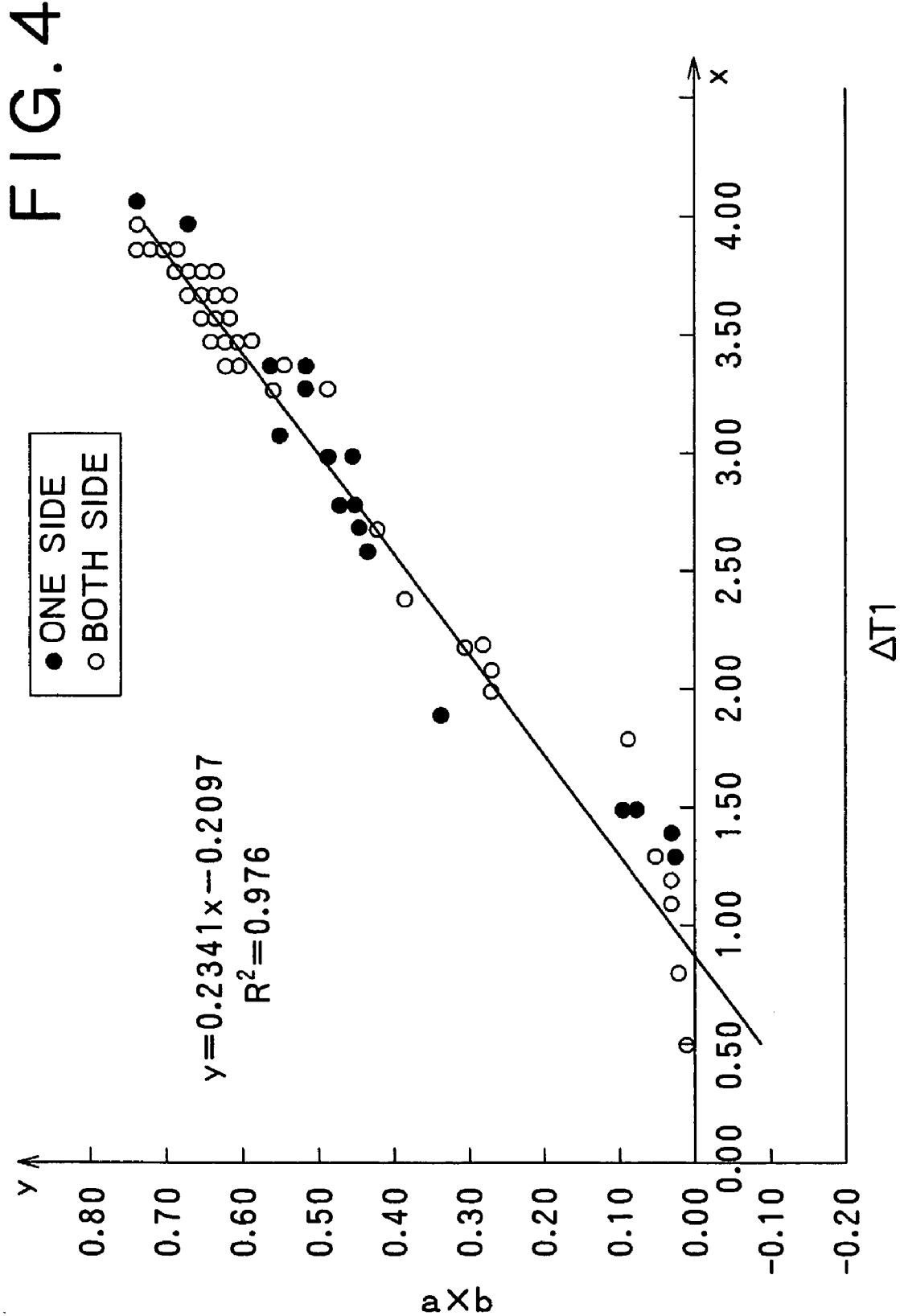
FIG. 4 is a graph showing the relationship between ΔT1 and the product (a×b) of the infrared emissivities from the surface side and back side.

These two indices expressing "thermal radiation property" are both useful and have a good mutual relationship. For your reference, the results of Examples (Tables 1 and 3) which will be described later are plotted in a graph and shown in FIG. 4. In the diagram, ● shows the results of the coated bodies different in the composition of the thermal radiative coatings formed on the surface side and back side; and ○ shows the results of the coated bodies same in the composition of the thermal radiative coatings on the surface side and back side (carbon black was added as a blackening additive).

According to the first coated body which satisfies such thermal radiation property, even if an amount of heat generated inside of the chassis increases (temperature increase occurs) owing to enhanced performance and size reduction of electronic devices, temperature therein can be reduced owing to excellent thermal radiation property. This enables life prolongation of the parts of an electronic device, power saving, noise reduction and enhancement of freedom of device designing (speed up, advance in function and miniaturization) so that the first coated body is very useful.

Each property will next be described.

(I) $\Delta T1 (=T1_B - T1_A) \geq 2.6°$ C.

In the equation, $T1_A$ represents the temperature, at Position T1, of the coated body of the present invention used as a sample and $T1_B$ represents the temperature, at Position T1, of a coating-film-free substrate used as a sample, each measured using the thermal radiation property evaluating apparatus of FIG. 1 which will be described later.

The above-described $\Delta T1$ is an index determined to find how much the temperature inside of an electronic device can be reduced when the coated body of the present invention is used compared with the use of a substrate (a bare substrate not covered with a coating). In the present invention, as an apparatus for measuring $\Delta T1$, a thermal radiation property evaluating apparatus as shown in FIG. 1, which apparatus is an original one in the present invention, is employed particularly. The apparatus of FIG. 1 is very useful as an apparatus capable of evaluating thermal radiation property of an electronic device under the atmospheric temperature (the atmospheric temperature varies, depending on the kind of the member of the electronic device, but is usually 50 to 70° C., about 100° C. at the maximum) which is presumed when the coated body is used for the electronic device. It enables correct evaluation of thermal radiation effect of the coated body when used for an electronic device under simulated practical conditions. Since there has conventionally been no such useful apparatus capable of evaluating thermal radiation property, such a thermal radiation property evaluating apparatus as shown in FIG. 1 is embraced within the scope of the present invention (which will be described later).

In FIG. 1, illustrated is an apparatus of rectangular parallelepiped having an inside space of 100 mm (length)× 130 mm (width)×100 mm (height). In FIG. 1, indicated at numeral 1 is a sample (test plate, area measured: 100×130 mm), 2 a heat insulating material, 3 a heating element [bottom area: 1300 m², length of the longest straight line which can be drawn within the area of the heating element (corresponding to the length of a diagonal line in FIG. 1): 164 mm] and 5 a thermometer.

As the heating element 3, employed is a silicone rubber heater having an aluminum plate (infrared emissivity; 0.1 or less) adhered thereon. At Position T1 in FIG. 1 [center of the inside space (50 mm above the heating element 3)], a thermocouple is fixed as the thermometer 5. The lower part of the thermocouple is covered for excluding the influence of heat radiation from the heating element. Since the atmospheric temperature inside the cabinet varies (and influences on thermal radiation property) depending on the kind of the material or using mode of the heat insulating material 2, a metal plate having an infrared emissivity of 0.03 to 0.06 [for example, electro galvanized steel plate (JIS SECC, or the like)] is used as it, and it is attached to the cabinet so as to control the atmospheric temperature (absolute temperature) at Position T1 within a range of about 73 to 74° C. when measured using the method as described below. The other factors (for example, a fixing method of a sample) having an influence on thermal radiation property are also controlled so that the atmospheric temperature (absolute temperature) at Position T1 would be about 73 to 74° C.

An evaluation method of thermal radiation property by using the apparatus will next be described.

Measurement is conducted under controlled conditions of a temperature of 23° C. and relative humidity of 60% in order to exclude variations in data owing to outside air conditions (wind, or the like).

First, each sample 1 is disposed. Power is supplied to heat a hot plate 3 to 140° C. After confirmation that the temperature of the hot plate becomes stable at 140° C. and the temperature at Position T1 becomes 60° C. or greater, the sample is taken out from the apparatus. When the temperature inside of the cabinet lowers to 50° C., the sample is disposed again. The temperature inside the cabinet is measured 90 minutes after re-disposal of the sample. Then, a difference (ΔT1) between the temperature of the sample and that of a substrate free of a coating is calculated.

ΔT1 in the present invention is determined by measuring the temperature 5 times per sample and finding an average of three data other than the upper limit and lower limit.

The greater ΔT1 thus calculated, the better thermal radiation property. It is preferred in the following order: 2.7° C. or greater, 3.0° C. or greater, 3.3° C. or greater, 3.5° C. or greater, 3.7° C. or greater and 4.0° C. or greater.

The index (target level) of thermal radiation property differs depending on the kind of an electronic device. According to the, present invention, as described later, thermal radiation property can be adjusted to target one easily by controlling the content of a blackening additive in the thermal radiative coating properly in view of the thickness of coating.

(II) Equation (1): a×b≧0.42

In the equation, (a) and (b) mean the integrated emissivity from the surface side and that from the back side, respectively, each at infrared wavelength (4.5 to 15.4 μm) when the coated body having a substrate covered, on the surface side and back side thereof, with respective thermal radiative coatings is heated to 100° C. The infrared integrated emissivity is measured by the method as described later. It is possible to measure the infrared integrated emissivity on the surface side and that on the back side, separately.

In other words, "infrared integrated emissivity" means releasability (absorptivity) of infrared waves (thermal energy). The greater the infrared emissivity, the greater the thermal energy amount released (absorbed). For example, when 100% of the thermal energy given to a substance (coated body in the present invention) is emitted, the infrared emissivity becomes 1.

In the present invention, an infrared integrated emissivity when the coated body of the present invention is heated to 100° C. is defined. In consideration of it being applied to electric appliances (atmospheric temperature differs depending on a member to which the coated body is applied, but it is usually 50 to 70° C., and 100° C. at the maximum), heating temperature is set equal to the temperature of such a practical level, that is, 100° C. It has however been confirmed by a test that even the coated body is heated to 200° C., the infrared integrated emissivity shows almost no change and the infrared integrated emissivity when heated to 200° C. is about 0.02 higher but substantially equal to that when heated to 100° C. (in Examples which will be described later, respective infrared thermal emissivities when heated at 100° C. and 200° C. are shown.)

In the present invention, the infrared integrated emissivity is measured as follows:

Apparatus: "JIR-5500 Fourier transform infrared spectrophotometer" and radiometric unit "IRR-200", product of JEOL.

Wavelength range to be measured: 4.5 to 15.4 μm

Measuring temperature: Heating temperature of a sample is set at 100° C.

Integration frequency: 200 times

Resolving power: 16 cm$^{-1}$

By using the above-described apparatus, the spectral radiant intensity (found value) in the infrared wavelength range (4.5 to 15.4 μm) was measured. The found value of the sample includes the radiant intensity of back ground and instrument function so that in order to obtain a correct value, the integrated emissivity is calculated using an emissivity measuring program [Emissivity Measuring Program of JEOL]. The following is the specific calculation method.

$$\varepsilon = (\lambda) = \frac{\frac{M(\lambda, T)}{A(\lambda)} - K_{FB}(v) - K_{TB}(\lambda, T_{TB})}{K_B(\lambda, T) - K_{TB}(\lambda, T_{TB})} \quad \text{[Equation 1]}$$

$$\varepsilon = (T) = \frac{\int_{\lambda_1}^{\lambda_2} \varepsilon(\lambda) \cdot K_B(\lambda, T) \cdot d\lambda}{\int_{\lambda_1}^{\lambda_2} K_B(\lambda, T) \cdot d\lambda} \quad \text{wherein,}$$

ε (λ): spectral emissivity (%) of sample at wavelength λ

E (T): integrated emissivity (%) at temperature T (° C.)

M (λ, T): spectral radiant intensity (found value) of sample at wavelength λ and temperature T (° C.)

A (λ): instrument function $K_{FB}$ (λ): spectral radiant intensity of fixed background (background which does not change according to sample) at wavelength λ

$K_{TB}$ (λ, $T_{TB}$): spectral radiant intensity of trap blackbody at wavelength λ and temperature $T_{TB}$ (° C.)

$K_B$ (λ, T): spectral radiant intensity of blackbody at wavelength and temperature T (° C.) $\lambda_1, \lambda_2$: wavelength range to be integrated In the above-described equation, A (λ: instrument function) and $K_{FB}$ (λ: spectral radiant intensity of fixed background) are calculated based on the found value of spectral radiant intensity of two blackbody furnaces (80° C., 160° C.) and the spectral radiant intensity (calculated using Planck's law) of blackbody at the temperature range.

$$A(\lambda) = \frac{M_{160°C.}(\lambda, 160°C.) - M_{80°C.}(\lambda, 80°C.)}{K_{160°C.}(\lambda, 160°C.) - K_{80°C.}(\lambda, 80°C.)} \quad \text{[Equation 2]}$$

$$K_{FB}(v) = \frac{K_{160°C.}(\lambda, 160°C.) \cdot M_{80°C.}(\lambda, 80°C.) - K_{80°C.}(\lambda, 80°C.) \cdot M_{160°C.}(\lambda, 160°C.)}{M_{160°C.}(\lambda, 160°C.) - M_{80°C.}(\lambda, 80°C.)}$$

wherein, $M_{160}$° C. (λ, 160° C.): spectral radiant intensity (found value) of blackbody furnace of 160° C. at wavelength λ

$M_{80}$° C. (λ, 80° C.): spectral radiant intensity (found value) of blackbody furnace of 80° C. at wavelength λ

$K_{160}$° C. (λ, 160° C.): spectral radiant intensity (calculated value using Planck's law) of blackbody furnace of 160° C. at wavelength λ

$K_{80}$° C. (λ, 80° C.): spectral radiant intensity (calculated value using Planck's law) of blackbody furnace of 80° C. at wavelength λ.

The reason why $K_{TB}$ (λ, $T_{TB}$) is considered upon calculation of integrated emissivity E (T=100° C.) is because a water-cooled trap blackbody is disposed around the sample upon measurement. Disposal of the trap blackbody makes it possible to control the spectral radiant emissivity of variable background radiation (this means background radiation which changes, depending on the sample employed. Owing to the reflection of the radiation from the periphery of the sample onto the surface of the sample, the found value of the spectral radiant intensity of the sample includes this background radiation) at a low level. As the above-described trap blackbody, a pseudo-blackbody having an emissivity of 0.96 is employed. The value $K_{TB}$ [($\lambda$, $T_{TB}$): spectral radiant intensity of trap blackbody at wavelength $\lambda$ and temperature $T_{TB}$ (° C.)] is calculated as described below.

$$K_{TB}(\lambda, T_{TB}) = 0.96 \times K_B(\lambda, T_{TB})$$

wherein, $K_B$ ($\lambda$, $T_{TB}$) means spectral radiant intensity of blackbody at wavelength $\lambda$ and temperature $T_{TB}$ (° C.)

In the first coated body of the present invention, the product (a×b) wherein (a) represents the infrared integrated emissivity from the surface side of the substrate covered with a thermal radiative coating and (b) represents the infrared integrated emissivity from the back side of the substrate covered with a thermal radiative coating satisfies 0.42 or greater [equation (1)], said integrated emissivity [the above-described E (T=100° C.)] being measured at infrared wavelength (4.5 to 15.4 μm). As described above, the value calculated from (a×b) (product of the infrared integrated emissivities released from the coated body) is useful as an index showing the thermal radiation effect of the coated body itself. The coated body capable of satisfying the above-described equation exhibits high radiation property on average in the above-described wavelength range so that the target level of thermal radiation property of the first coated body is determined at "a×b≧0.42". The greater the value of "a×b" (1 at the maximum), in other words, the closer it is 1, the better thermal radiation property the coated body exhibits. It is preferred in the following order: 0.49 or greater, 0.56 or greater, 0.61 or greater, 0.64 or greater and 0.72 or greater.

Insofar as the first coated body satisfies the target level of the thermal radiation property, no particular limitation is imposed on the relationship between the infrared emissivity from the surface side and that from the back side. Both the coated body different in infrared emissivity between the surface side and back side and that similar in infrared emissivity between them are embraced. The second coated body of the present invention, on the other hand, aims at improvement of both thermal radiation property and self cooling property. A difference between the first and second coated bodies exists in that the latter must have an infrared emissivity higher on the surface side than on the back side [which will be described later in [B]].

Described specifically, infrared emissivities from both sides can be determined freely insofar as the equation (1) of thermal radiation property "a×b≧0.42" is satisfied. Since the maximum value of the infrared emissivity is 1, at least the infrared emissivity from one side is set at 0.42 or greater in order to satisfy the equation (1); at least the infrared emissivity from one side is set at 0.56 or greater in order to satisfy a×b≧0.56, and at least the infrared emissivity from one side is set at 0.64 or greater in order to satisfy a×b≧0.62.

The greater the infrared emissivity from one side, the better. The coated body in which the infrared emissivity from at least one side satisfies 0.65 or greater is preferred. The infrared emissivity from at least one side is preferred in the following order: 0.7 or greater, 0.75 or greater, and 0.8 or greater. The coated body in which the infrared emissivities from both sides are each 0.65 or greater is more preferred.

Moreover, in the first coated body, a difference between the maximum value A and the minimum value (A−B) of the spectral emissivity at any wavelength region of infrared waves (wavelength: 4.5 to 15.4 μm) is preferably 0.35 or less. This (A−B) indicates a variation of emissivity in the above-described infrared wavelength region and when the equation "A−B≦0.35" is satisfied, high thermal radiation property can be exhibited stably in any infrared wavelength region. Coated bodies capable of satisfying the above-described requirement can also be used for electronic devices having, mounted thereon, various parts different in the infrared wavelength emitted therefrom. Expansion of its application to members of an electronic device can therefore be expected. Described specifically, as described above, emissivity is measured at any infrared wavelength region and a difference between the maximum value and the minimum value (A−B) of the spectral emissivity at the wavelength region is calculated as "variation range of emissivity". The smaller the value (A−B), the more stable thermal radiation property is available. The value (A−B) is more preferably 0.3 or less, still more preferably 0.25 or less.

A description will next be made of specific constitution for obtaining the first coated body.

The coated body has a substrate covered, on the surface side and back side thereof, with respective thermal radiative coatings having thermal radiation property. Desired thermal radiation property is available by properly controlling the content X (mass %, "%" will hereinafter mean "mass %" unless otherwise specifically indicated) of a blackening additive in at least one of the thermal radiative coatings, while taking the thickness Y (μm) of the coating in consideration. Described specifically, X and Y satisfy the below-described equation (2), of which X preferably satisfies the below-described equation (3) and Y preferably satisfies Y>1 μm.

1. Equation (2): $(X-3) \times (Y-0.5) \geq 15$

The calculated value of the left side [$(X-3) \times (Y-0.5)$] may hereinafter be represented by Value P.

The above-described equation (2) determines the relationship between the content X (%) of a blackening additive in at least one of the thermal radiative coatings and thickness Y (μm) of the coating, as a requirement to attain the above-described thermal radiation property [an index such as ΔT1 or (a×b)]. The above-described equation suggests that for attaining "thermal radiation property" as defined for the first coated body, it is necessary to properly control the content of a blackening additive such as carbon black, while taking the thickness of the coating into consideration. In the equation, mathematized is the finding of the present invention that "when the film is thin, the content of a blackening additive in it must be increased (which means an increase in the content of the blackening additive per thickness) and when the coating is thick, the content of the blackening additive in it does not need to be high (which means a decrease in the content of the blackening additive per thickness).

Figure 5:
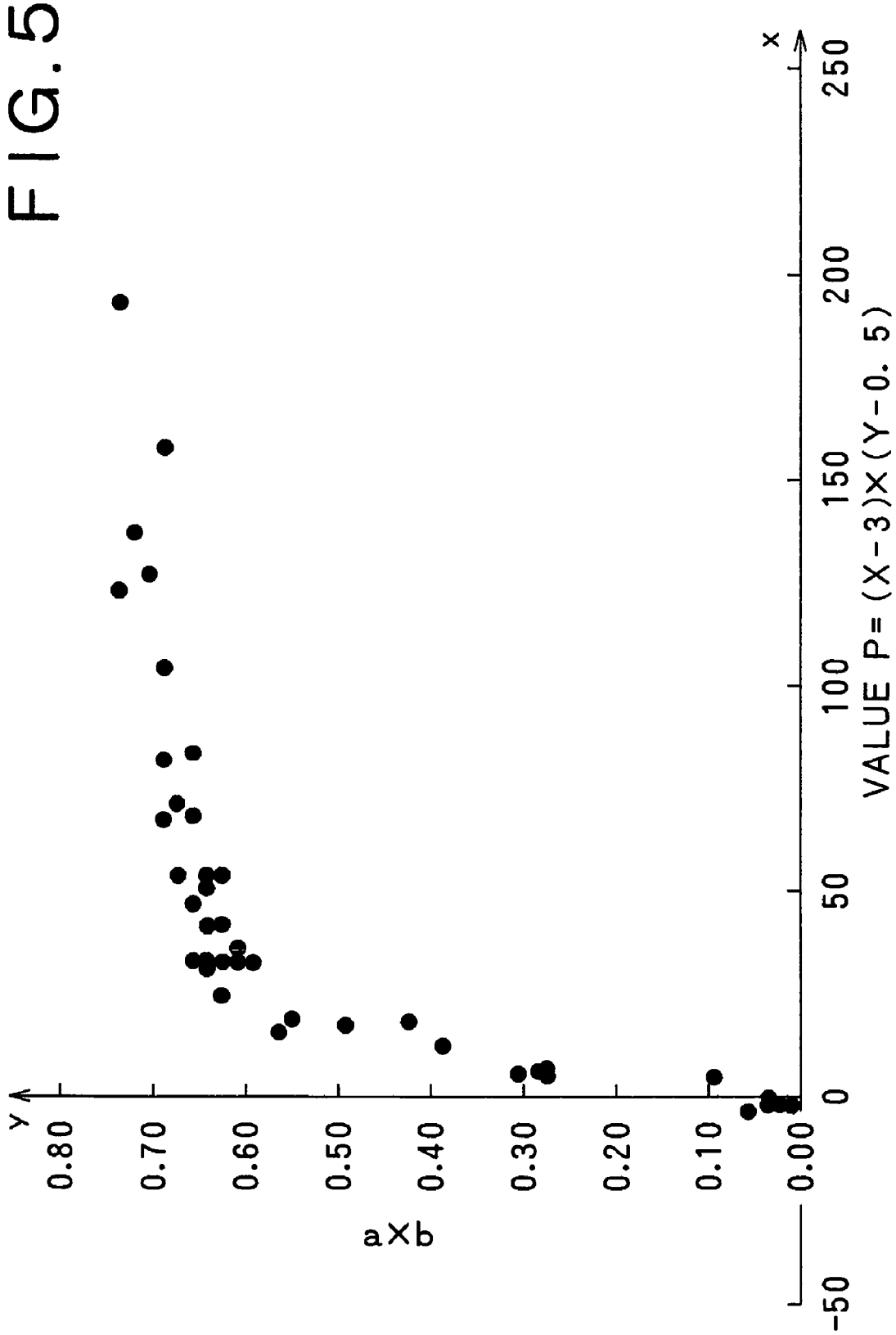
FIG. 5 is a graph showing the relationship between the Value P [=(X−3)×(Y−0.5)] and the product (a×b) of the infrared emissivities from the surface side and back side.

Here, there generally exists good mutual relationship between the value P [$=(X-3) \times (Y-0.5)$] and the thermal radiation property. FIG. 5 is the relationship between the value P and thermal radiation property (a×b) shown in graph based on the results (Tables 4 and 5) of Examples which will be described later. The diagram suggests that the value P must be set at 15 or greater in order to attain the thermal radiation property of the target level (a×b≧0.42, ΔT1≧2.6° C.) of the first coated body. When the target thermal radiation property is established, the value P corresponding to it is calculated. By properly adjusting the ranges of X and Y to satisfy the calculated value P, the target thermal radiation property can be attained easily, which is the merit of the present invention.

It is noted that the greater the value P is, the better thermal radiation property can be attained. Thus the value P is preferably 30 or greater.

If the value P is increased too much, however, improvement in thermal radiation property is saturated and an increase in the amount of a blackening additive is economically useless. Moreover, in considering that the coated body of the present invention is used for a cabinet of an electronic device and it is therefore required to have formability and electric conductivity, control of the upper limit of the value P is recommended. The upper limit is desired in the following order: 240, 200, 150 and 100.

2. Equation (3): 4%≦X≦15%

In the present invention, the content of a blackening additive is set at 3% or greater, with 4% or greater being recommended. The reason why the content is set at "X≧3%" is because in order to satisfy the above-described equation (2), the coefficient (X−3) of the left side must be positive (>0).

The lower limit of X is set in order to attain excellent thermal radiation property and also properties (coatability, appearance, and the like) of the coated body itself. At the content not greater than 3%, desired properties are not available. The lower limit is desired in the following order: 5%, 7%, 8% and 10%. Although no particular limitation is imposed on the upper limit of X in relation to the thermal radiation property, the content of 15% or greater deteriorates coatability, makes coating uneven and ruins appearance. The upper limit in view of coatability or the like is desired in the following order: less than 15%, 13% or 11%.

3. Y>1 μm

Thickness Y of a thermal radiative coating is set to exceed 0.5 μm, preferably 1 μm. The reason why "Y>0.5 μm" is set as a premise is because in order to satisfy the above-described equation (4), the coefficient (Y−0.5) of the left side of the equation must be positive (>0).

The above-described lower limit of Y is set in order to attain excellent thermal radiation property. When Y is not greater than 0.5 μm, desired thermal radiation effect is not available even by the addition of a blackening additive in a large amount. The lower limit is preferred in the following order: 3 μm, 5 μm, 7 μm and 10 μm.

Although no particular limitation is imposed on the upper limit of Y in relation to thermal radiation property, control of the upper limit to 50 μm or less (45 μm or less, 40 μm or less, 35 μm or less, and 30 μm or less in the desired order) is recommended in considering that the coated body of the present invention is used for parts of an electronic device, improvement of formability is sometimes necessary in such an application, and cracks or peeling of a coating upon bending must be prevented.

Control of the thickness Y to 12 μm or less (preferably 11 μm or less, more preferably 10 μm or less) is recommended for imparting the coated body with better formability and excellent electric conductivity.

Thus, the content X of a blackening additive and thickness Y of a coating in the equation (2) were described.

No particular limitation is imposed on the blackening additive usable in the present invention insofar as it is capable of imparting a target with a black color. Typical example is carbon black. Other examples include oxides and sulfides and carbides of Fe, Co, Ni, Cu, Mn, Mo, Ag or Sn, and black fine metal powder. Of these, carbon black is most preferred.

The amount (X) of carbon black in the coating can be measured in the below-described manner.

After addition of a solvent to a test sample (sample to be analyzed), it is heated to decompose the organic matters in the test sample. The kind of the solvent to be used here differs with the kind of a base resin. A proper solvent may be used according to the solubility of each resin. For example, when a polyester resin or urethane resin is used as a base resin, the test sample is added to a container (eggplant type flask) in which a methanol solution of sodium hydroxide has been added and the container is heated over a water bath of 70° C. to decompose the organic matters in the test sample.

These organic matters are then filtered off through a glass filter (pore size: 0.2 μm). Carbon in the resulting residue is determined by combustion infrared absorption analysis method and based on it, the concentration of carbon black in the coating is calculated.

The blackening additive is preferably controlled to have an average particle size of 5 to 100 nm. When the average particle size is less than 5 nm, desired thermal radiation property is not available. In addition, stability of the coating lowers, leading to inferior appearance after coating. When the average particle size exceeds 100 nm, on the other hand, not only thermal radiation property lowers, but also the appearance after coating becomes uneven. The particle size is preferably 10 nm or greater but not greater than 90 nm, more preferably 15 nm or greater but not greater than 80 nm. Adjustment of the optimum average particle size of the blackening additive at about 20 to 40 nm is recommended in consideration of the stability of coating and uniform appearance after coating, as well as thermal radiation property.

No particular limitation is imposed on the kind of the resin (base resin to form a thermal radiative coating) to be added to the coating from the viewpoint of thermal radiation property. Examples include acrylic resins, urethane resins, polyolefin resins, polyester resins, fluorine resins, and silicone resins, and mixed or modified resins thereof. They can be used as desired. The coated body of the present invention is used as a cabinet of an electronic device, so improvement in formability is also required in addition to thermal radiation property. If it is taken into consideration, the base resin is preferably a non-hydrophilic resin [more specifically, a resin having a contact angle with water of 30° or greater (preferably 50° or greater, more preferably 70° or greater)]. Although the resin capable of satisfying such a non-hydrophilic property differs with its mixing degree or modification degree, but use of a polyester resin, polyolefin resin, fluorine resin, silicone resin, or mixed or modified resin thereof is preferred, of which the use of a polyester resin or modified polyester resin (an epoxy-modified polyester resin, a thermosetting polyester resin such as a polyester resin having a phenol derivative introduced in the main chain thereof, or an unsaturated polyester resin) is recommended.

To the coating, a pigment such as rust inhibitive pigment or silicate may be added, as well as the blackening additive such as carbon black within an extent not damaging the effect of the present invention. An additive (at least one additive selected from $TiO_2$, ceramics, iron oxide, aluminum oxide, barium sulfate and silicon oxide) having thermal radiation property, other than carbon black, may be added within an extent not impairing the effect of the present invention.

To the coating, a crosslinking agent can be added. Examples of the crosslinking agent usable in the present invention include melamine compounds and isocyanate compounds. Addition of one or more of them in an amount ranging from 0.5 to 10 wt. % is recommended.

Thus, the coated body of the present invention is covered with a thermal radiative coating containing a blackening additive such as carbon black. A coated steel plate having a resin coating added with a blackening pigment such as carbon black has already been disclosed.

For example, in Japanese Patent Laid-Open No. 120378/1991, disclosed is a process for producing a far infrared emission plate (having a base on which a ceramic layer having far infrared property has been formed) used as a member of a thermal tool. It includes such a description "a blackening pigment such as carbon black may be added to a predetermined black acrylic resin coating. By the addition, far infrared emission property is exhibited. The amount of the pigment is 0.1 to 10parts by weight per 100 parts by weight of the resin and the resin coating thickness is usually 0.1 to 5 µm".

The infrared ray emission plate described in the above-described patent has a ceramic layer formed only on one side of a base. Since it is different from the coated plate of the present invention having a substrate covered, on both sides thereof, with a coating, desired thermal radiation property is not available.

The above-described far infrared emission plate and the coated body of the present invention are different in the object to be applied (using purpose) so that they are different in a basic idea for solving the problem and in constituting requirement. Described specifically, the far infrared emission plate is used in thermal tools (typified by a stove) which require thermal radiation property under markedly high-temperature conditions such as about 200 to 300° C. Different from the coated body of the present invention, this plate is not developed at all to use for members of an electronic device whose internal temperature becomes about 40 to 70° C., even about 100° C. at the maximum under atmospheric temperature. In the above-described patent, only an increase of a far infrared emissivity (radiant heat) from thermal tools such as stove as much as possible is intended and for this purpose, carbon black is added. Since the far infrared emission plate is designed for use as the plate for thermal tools, there is no room left for the above-described patent to have an idea leading to so-called "heat transfer system", that is, "heat released from an electronic device is absorbed from the back side of a substrate→into the surface of the substrate→emitted, to lower the inside temperature of the electronic device".

As a matter of fact, it has been confirmed by the test (No. 19 in Table 5 which will be described later) that as a result of investigation of the integrated emissivity and variation range of emissivity under the conditions as described in the present patent, thermal radiation property of the far infrared emission plate is inferior to that of the coated body of the present invention, because the former emission plate has been coated only at one side.

In the above-described gazette, far infrared emission property is caused to exhibit in a high temperature range by carrying out blackening treatment using a Zn—Ni alloy coated steel plate as a base, thereby forming a black coating and then covering it with a black resin coating. If such an emission plate is applied to the members of an electronic device (used in a far lower temperature region compared with the far infrared emission plate), which are subjects of the present invention, as is, various inconveniences occur because required properties differ with a difference in applications. Described specifically, (1) since the bending conditions for the members for an electronic device are severer than those for a thermal tool, cracks appear in the alloy coated layer bent under such conditions, and from them, peeling or dropping of the black resin coating or plating dust occurs, thereby ruining its appearance; and (2) when such peeling or dropping phenomenon occurs inside of the alloy coated layer, peeled coating or plating dust attaches to and accumulate on the parts of an electronic device, thereby presumably causing disorders of the electronic device.

Accordingly, the coated body of the present invention and the above-described emission plate are different inventions.

The thermal radiative coating containing a blackening additive was so far described. In the above-described first coated body, at least one of the thermal radiative coatings formed on the surface side and back side of the substrate contains mainly the blackening additive. The other thermal radiative coating is not limited to it and can be formed by adding an additive having thermal radiation property (which may hereinafter be called "another thermal radiative additive), other than the blackening additive, so as to satisfy desired thermal radiation property as determined by the present invention. It is needless to say that the coated body having a substrate covered, on the surface side and back side thereof, with thermal radiative coatings each added with a blackening additive is especially preferred.

Examples of the "another thermal radiative additive" include $TiO_2$, ceramics, iron oxide, aluminum oxide, barium sulfate and silicon oxide. These additives may be used either singly or in combination. The thickness of the thermal radiative coating containing mainly "another thermal radiative additive" can be set as desired so as to attain desired thermal radiation property. Although it depends on the kind or using purpose of "another thermal radiative additive" employed, recommended thickness is about 15 to 30 µm.

In the case of a $TiO_2$-containing coating, an infrared emissivity of around 0.8 can be attained by forming a coating containing about 40 to 60% of $TiO_2$ to give a thickness of about 25 to 30 µm. Addition of a blackening additive such as carbon black to the coating increases the infrared emissivity further. When a coating of metallic finish is desired, 5 to 30% of Al flake or the like is added to the coating and the thickness of the coating is set at about 5 to 30 µm. Then, an infrared emissivity of about 0.6 to 0.7 can be attained.

[B] Coated Body (Second Coated Body) for Members of an Electronic Device Excellent in Thermal Radiation Property and Self Cooling Property The second coated body has a substrate covered, on the surface side and back side thereof, with coatings and, at least the surface side of the substrate, covered with a thermal radiative coating having thermal radiation property. It satisfies, as an index of "excellent self cooling property", $\Delta T2$ (extent of temperature increase suppression of the coated body itself) described in (III) or the equation (4) [$b \leq 0.9(a-0.05)$] described in (IV); and, as an index of "excellent thermal radiation property" in the second coated body, the equation (5) [$(a-0.05) \times (b-0.05) \geq 0.08$] described in (V).

First, the index of self cooling property will be described.

The equation (4) serves as an index of thermal radiation effect for transferring the heat absorbed in the coated body toward the outside air side by setting the infrared emissivity on the surface side higher than that on the back side. $\Delta T2$ is, on the other hand, an index of thermal radiation effect at a practical level established by simulating the use of the coated body for an electronic device.

Figure 6:
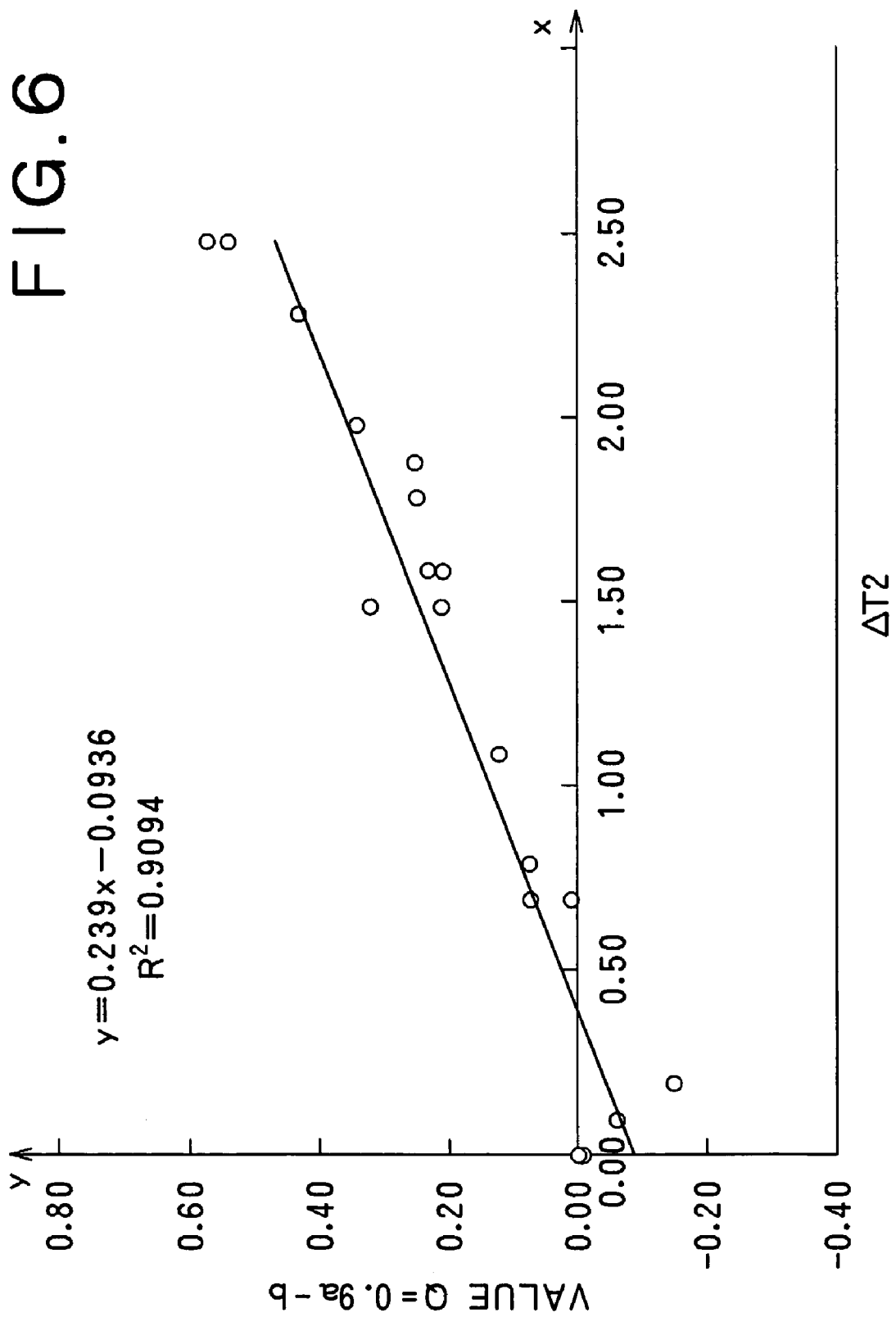
FIG. 6 is a graph showing the relationship between ΔT2 and Value Q (=0.9a−b) in Example 5.

Both of these indices are useful as an index of "self cooling property" and have a good mutual relationship. For your reference, shown in FIG. 6 are the results of Examples, which will be described later, plotted in graph. The calculated value (which may hereinafter be represented by "Value Q") of the left side (0.9a−b) of the modified equation of (4): [$(0.9a-b) \geq 0.05$] is plotted along the ordinate of FIG. 6.

In the second coated body satisfying such self cooling property, a temperature increase of the coated body itself can be suppressed so that electronic devices which are safe for users can be supplied, for example, even if users touch, during the device operation, its cabinet to which the coated body has been applied, they do not feel heat. This coated body also has good thermal radiation property. Members of an electronic device having both properties are very useful for expanding their applications further.

In the next place, the three properties will be described.

(III) $\Delta T2 (=T2_B - T2_A) \geqq 0.5°$ C.

In the above-described equation, $T2_A$ represents the temperature, as measured using the above-described thermal radiation property evaluating apparatus shown in FIG. 1, of a coated body of the present invention used as a sample; and $T2_B$ represents the temperature, as measured using the same apparatus, of a substrate not covered with a coating used as a sample. Measurement was conducted in a similar manner to that employed for the measurement of $\Delta T1$. A difference ($\Delta T2$) in temperature when the sample is used and that when a substrate not covered with a coating is used is calculated.

It should be noted that $\Delta T2$ in the present invention is an average of 5 times measurement of each sample except the upper and lower limits.

The $\Delta T2$ is an index (self cooling property) of how a temperature increase of a coated body itself can be suppressed upon operation of an electronic device by using the coated body of the present invention compared with the use of a substrate (a bare substrate not covered with a coating). In the present invention, the thermal radiation property evaluation apparatus as shown in FIG. 1, which apparatus is original in the present invention, is used for measurement of $\Delta T2$.

The greater the $\Delta T2$, the better for attaining excellent self cooling property. The $\Delta T2$ is preferred in the following order: 1.0° C. or greater, 1.5° C. or greater, 2.0° C. or greater and 2.5° C. or greater.

(IV) Equation (4): $b \leqq 0.9(a-0.05)$

In the equation, (a), (b) and measuring method of infrared integrated emissivity are similar to those described above in (II).

As described above, the equation (4) is also useful as an index of "self cooling property", that is, suppression of a temperature increase of a coated body itself. This equation specifies the relational expression of infrared emissivities on the surface side and back side of the substrate of a coated body permitting maintenance of desired self cooling property ($\Delta T2 \geqq 0.5°$ C.), based on the concept of "a temperature increase of the coated body itself is suppressed by forming a coating having higher infrared emissivity on the surface side (outside air side) of the substrate than the infrared emissivity of the coating formed on the back side (inner side of the electronic device) of the substrate".

When a coated body is used for the cabinet of an electronic device, an increase in the infrared emissivity on the inner side of the cabinet (back side) raises the absorption amount of infrared waves emitted from the heat source in the electronic device, leading to a temperature rise of the coated body itself. An increase in the emissivity on the outer side of the cabinet (surface side), on the other hand, raises the amount of infrared waves emitted from the coated body toward the outside air, leading to a temperature decrease of the coated body. Based on such finding, the above-described equation is established after various tests. The present invention makes it possible to efficiently suppress a temperature increase of the coated body itself, because the amount emitted from the surface side of the substrate exceeds the amount of heat absorbed (emitted) on the back side of the substrate.

Such a coated body having coatings different in thermal radiation property disposed on the surface side and back side of a substrate, thereby suppressing a temperature increase of the coated body while maintaining the level of thermal radiation property to some extent has not been known yet and is novel.

Accordingly, the greater a difference in the infrared emissivity between (a) and (b), the better self cooling property is available. More specifically, the greater the value Q (=0.9a−b), the better. The value Q is preferred in the following order: 0.13 or greater, 0.24 or greater, 0.35 or greater and 0.47 or greater.

(V) Equation (5): $(a-0.05) \times (b-0.05) \geqq 0.08$

The equation (5) specifies the index of thermal radiation property of the second coated body by the product of infrared integrated emissivities on the surface side and on the back side. The greater the calculated value (which may hereinafter be represented by "value R") of the left side [$(a-0.05) \times (b-0.05)$], the better the thermal radiation property ($\Delta T1$). The lower limit is preferred in the following order: 0.35 (corresponding to about 2.6° C. in $\Delta T1$) and 0.52 (corresponding to about 3.5° C. in $\Delta T1$)

Figure 7:
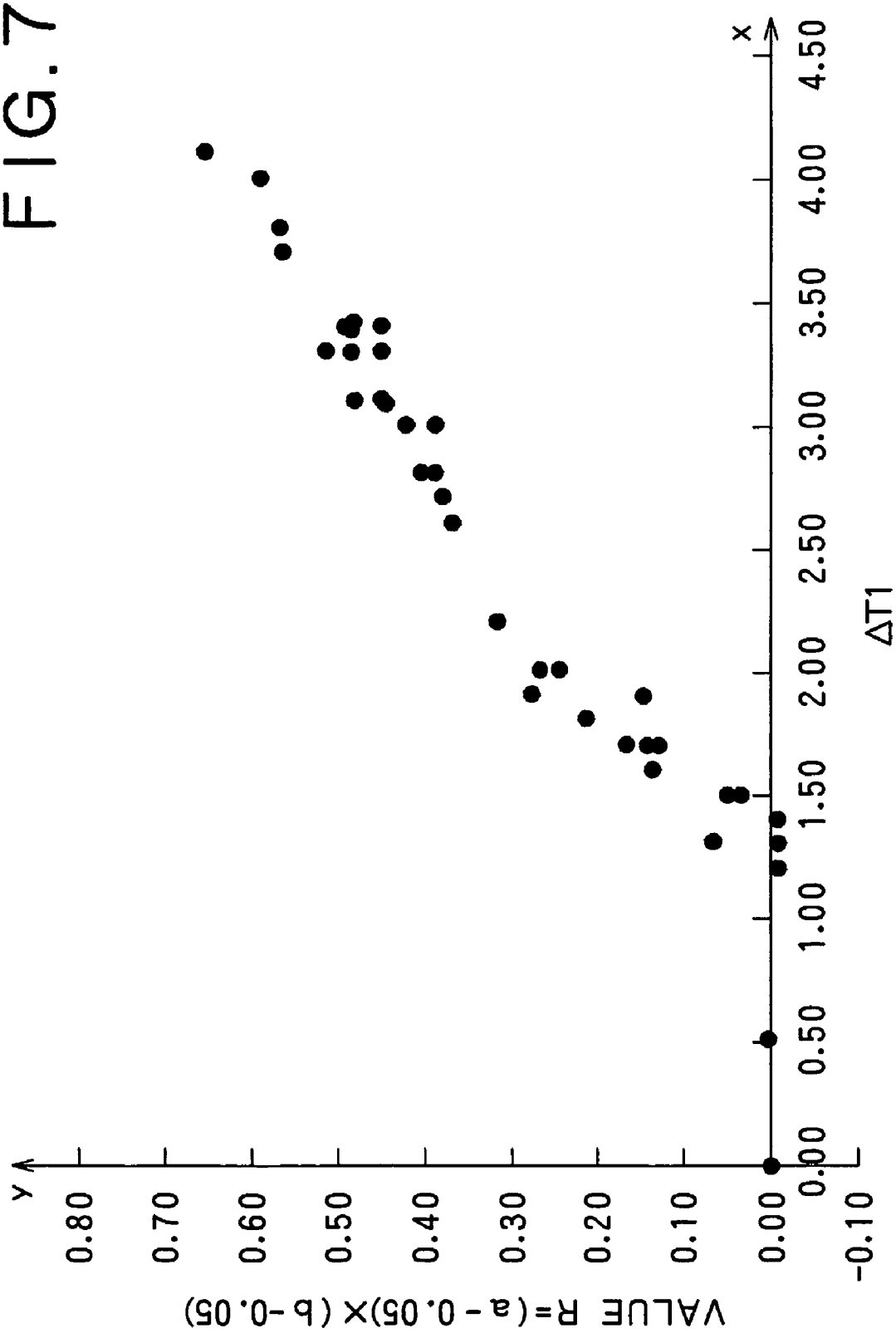
FIG. 7 is a graph showing the relationship between ΔT1 and Value R [=(a−0.05)×(b−0.05)] in Example 5.

The above-described equation (5) has a good mutual relationship with the above-described $\Delta T1$ ("a difference in the inside temperature of an electronic device" which was described in the first coated body). For your reference, results of Examples, which will be described later, plotted in a graph are shown in FIG. 7.

Compared with the thermal radiation property level ($\Delta T1 \geqq 2.6°$ C. in terms of $\Delta T1$) of the first coated body, that ($\Delta T1 \geqq 1.5°$ C.) of the second coated body has a wide permissible range. It is established based on the finding that the main problem to be solved in the second coated body is improvement of self cooling property and insofar as this problem is overcome, the second coated body may have thermal radiation property a little lower than the first coated body.

Next, the specific constitution to obtain the second coated body will be described.

The coated body has a substrate covered, on the surface side and back side thereof, with coatings and at least the coating on the surface side has thermal radiation property. In order to attain desired self cooling property, it is necessary to satisfy the equation (4) by making the infrared emissivity on the surface side higher than that on the back side; and at the same time, to satisfy at least the equation (5) with regards to the thermal radiation property. In this second coated body, thermal radiation property required is different between the surface side and the back side so that description will be made, depending on some cases.

The "thermal radiative coating on the surface side" of the second coated body embraces the following embodiments (i) and (ii).

(i) Embodiment in which a Blackening Additive is Mainly Added and the Content (X) of the Blackening Additive in a Thermal Radiative Coating is Controlled in View of the Thickness (Y) of the Coating When thermal radiation property is improved by adding a blackening additive to the coating on the surface side, X (amount of the blackening additive) and Y (thickness of the coating) may be controlled as desired so as to satisfy the below-described equation (6). The controlling method will be described below specifically in [4] to [6].

4. Equation (6): $(X-3) \times (Y-0.5) \geqq 3$

Equation (6) is a relational expression of X and Y for attaining the target level ($\Delta T1 \geqq 1.5°$ C.) of thermal radiation property of the second coated body. The greater the value P $[(X-3) \times (Y-0.5)]$, the better thermal radiation property available. It is desired in the following order: 7 or greater, 11 or greater, 15 or greater, 30 or greater and 50 or greater.

Even if the value P is increased too much, improvement in thermal radiation property is saturated and an increase in the amount of a blackening additive is economically useless. Moreover, in considering that the coated body of the present invention is used for a cabinet of an electronic device and it is required to have formability and electric conductivity, control of the upper limit of the value P is recommended. The upper limit is desired in the following order: 240, 200, 150 and 100.

The lower limit of the equation (6) is smaller than that of the equation (2) established in the first coated body, because the thermal radiation property of the second coated body embraces a little lower level compared with that of the first coated body and its permissible range is widened.

5. Equation (7): $4\% \leqq X \leqq 15\%$

The content of the blackening additive is 3% or greater, with 4% or greater being recommended. The reason why "X>3%" is set as a premise is that in order to satisfy the above-described equation (6), (X−3), a coefficient of the left side of the equation must be positive (>0).

The lower limit of X is determined in order to attain excellent thermal radiation property and at the same time to maintain the properties (coatability, appearance, and the like) of the coated body itself. At the content not greater than 3%, desired properties are not available. The lower limit is preferred in the following order: 5%, 7%, 8% and 10%. Although no particular limitation is imposed on the upper limit of X in relation to the thermal radiation property, the content of 15% or greater deteriorates coatability, makes coating uneven and ruins appearance. The upper limit in consideration of coatability or the like is preferred in the following order: less than 15%, 13% or 11%.

6. $Y > 1$ μm

Thickness Y of a thermal radiative coating is set to exceed 0.5 μm, preferably 1 μm. The reason why "Y>0.5 μm" is set as a premise is because in order to satisfy the above-described equation (6), the coefficient (Y−0.5) of the left side of the equation must be positive (>0).

The above-described lower limit of Y is set in order to attain excellent thermal radiation property. When Y is not greater than 0.5 μm, desired thermal radiation effect is not available even by the addition of a blackening additive in a large amount. The lower limit is preferred in the order of 3 μm, 5 μm, 7 μm and 10 μm.

Although no particular limitation is imposed on the upper limit of Y in relation to thermal radiation property, control of the upper limit to 50 μm or less (45 μm or less, 40 μm or less, 35 μm or less, and 30 μm or less in the desired order) is recommended in considering that the coated body of the present invention is used for parts of an electronic device, improvement of formability is sometimes necessary in such an application, and cracks or peeling of a coating upon bending must be prevented.

Control of the thickness Y to 12 μm or less (preferably 11 μm or less, more preferably 10 μm or less) is recommended for imparting the coated body with better formability and excellent electric conductivity.

(ii) Embodiment in which an Additive Other than a Blackening Additive is Added Mainly When an additive other than a blackening additive is used in order to improve thermal radiation property of the coating on the surface side, usable additives include $TiO_2$, ceramics, iron oxide, aluminum oxide, barium sulfate and silicon oxide. These additives may be used either singly or in combination. A blackening additive such as carbon black may be added further. The thickness of the thermal radiative coating can be determined as needed depending on the kind of the additive employed, but thickness of about 5 to 30 μm is usually recommended.

More specifically, in the case of a $TiO_2$-containing coating, addition of titanium oxide to the coating in an amount of about 50 to 70%, and adjustment of the coating thickness to about 25 to 30 μm are recommended. When appearance of metallic finish is desired, addition of Al flake in an amount of about 5 to 30%, and adjustment of the coating thickness to about 5 to 30 μm are recommended.

A description will next be made of "the coating on the back side" in the second coated body of the present invention. The above-described "coating on the surface side" must be a thermal radiative coating in order to maintain excellent self cooling property, but the "coating on the back side" is not necessarily a thermal radiative coating insofar as desired properties of the second coated body can be attained. The second coated body does not embrace "one-side coated steel plate" which has no coating on the back side of a substrate (a substrate without a coating thereon exhibits an infrared emissivity of about 0.04 so that desired self cooling property is not available). Any coating can be adopted insofar as it satisfies the above-described equation (4).

The coating on the back side can be formed by using one or plural additives selected from the above-described blackening additives and additives other than the blackening additives and adjusting its (their) amount and coating thickness as needed depending on the emissivity on the coating on the surface side. When the blackening additive is employed for the formation of the coating on the back side, the relationship between X and Y does not necessarily satisfy the above-described equation (6). Even if the coating has little thermal radiation property (the value P is less than 0), desired self cooling property can be attained only by properly controlling the infrared emissivity of the coating on the surface side (refer to Nos. 1 and 11 in Table 6 which will be described later).

A coating free of the above-described additive and having a thickness controlled within a predetermined range (about 2.5 μm or greater) can also be adopted (refer to Nos. 3 to 7 in Table 6 which will be described later), because thermal radiation property can be attained to some extent only by a resin contained in the coating.

When a non-hydrophilic polyester resin is used as a coating-coating-forming resin, the thickness of the coating may be adjusted to about 2.5 μm or greater.

Basic constitution of the second coated body according to the present invention concerning the blackening additive/another additive to form the coatings on the surface side back side was described. In the coating of the second coated body, the kind and average particle size of the blackening additive, the kind of the additive other than the blackening additive, the kind of the resin or additive added to the coating and the like are similar to those described above in the first coated body.

[C] Coated Body (Third Coated Body) for Members of an Electronic Device which have Improved Electric Conductivity Over the Coated Bodies in [A] and [B]

The third coated body according to the present invention has, in addition to the properties of the first and second coated bodies, excellent electric conductivity. As its index, an electric resistance is set at 100 Ω or less. It is preferably 10Ω or less.

The electric resistance is measured in the below-described manner.

Used are an electric conductivity measuring apparatus are "Loresta EP", (trade name; product of Mitsubishi Chemical) and 2-pin probe ("MCP-TP01", product of Mitsubishi Chemical). Upon measurement, two copper plates, each 20 mm square and 0.8 mm thick, are placed apart between the pin of the probe and a sample to be measured, whereby the resistance (Ω) of the sample is measured.

To obtain such a coated body having excellent electric conductivity, a conductive filler is added in an amount of 10 to 50% to the coating on the surface side and/or on the back side. In the present invention, the first coated body and second coated body each has a substrate covered, on the surface side and back side thereof, with coatings. If a conductive filler is added to the surface side and back side of the substrate, the resulting coated body has excellent electric conductivity. In some applications, however, predetermined electric conductivity can be attained even by the addition of a conductive filler to one of these sides.

Examples of the conductive filler usable in the present invention include single metals such as Ag, Zn, Fe, Ni and Cu; and metal compounds such as FeP. Of these, Ni is especially preferred. Although no particular limitation is imposed on the form of the filler, scaly one is recommended in order to attain better electric conductivity.

The content of the conductive filler is 10 to 50% based on 100% (in terms of a solid content) of the coating forming components (all the coating-coating-forming components including a base resin such as polyester resin, a crosslinking agent added as needed, a blackening additive, a conductive filler and optionally, an additive). At the content less than 10%, desired effects are not available. The content of the conductive filler is preferably 15% or greater, more preferably 20% or greater, still more preferably 35% or less. When the content of the conductive filler exceeds 50%, formability lowers. Particularly when the coated body is applied to a site which requires high-level bending property such as coated metal plate, the content is preferably adjusted to 45% or less, more preferably 40% or less, still more preferably 35% or less.

The coating featuring the coated body of the present invention was described in detail. As described above, the most important point of the present invention is that the constitution of the coating was specified. No particular limitation is imposed on the substrate. Examples of the substrate usable in the present invention therefore include (1) metal sheets, more specifically, steel sheets such as cold-rolled steel sheet, hot-rolled steel sheet, electro galvanized steel sheet, hot dipped galvanized steel sheet (GI), galvanneal steel sheet (GA), 5% Al—Zn coated steel sheet, 55% Al—Zn coated steel sheet, various coated steel sheets of Al or the like, and stainless steel sheet, and known metal sheets; and (2) substrates other than metal sheets such as wire rod, rod stock, pipe material and ceramic material. The metal sheet (1) subjected to surface treatment such as chromate or phosphate treatment in order to improve corrosion resistance, adhesion of coating or the like is also embraced within the scope of the present invention. Of these, preferred are metal materials such as metal sheet and ceramics which are excellent in thermal electric conductivity.

The above-described metal sheets (1) may be subjected to surface treatment such as chromate treatment or phosphate treatment in order to improve corrosion resistance and adhesion of the coating. Alternatively, metal sheets subjected to non-chromate treatment may be used. Metal sheets subjected to any surface treatment are embraced within the scope of the present invention.

The constitution of the coated body of the present invention using a metal sheet subjected to non-chromate treatment will next be described.

In the above-described substrate subjected to chromate-free surface treatment, the thermal radiative coating (at least, the surface side) is required to contain an antirust agent further, because it is known that in general the non-chromate treatment lowers corrosion resistance and use of the antirust agent is indispensable for improving the corrosion resistance.

No particular limitation is imposed on the above-described "chromate-free surface treatment" and ordinarily-employed known surface treatment may be used. More specifically, use of phosphate, silicate, titanium and zirconium surface treatments either singly or in combination is recommended.

Examples of the above-described antirust agent include silicate compounds, phosphate compounds, phosphite compounds, polyphosphate compounds, organic sulfur compounds, benzotriazole, tannic acid, molybdate compounds, tungstate compounds, vanadium compounds, and silane coupling agents. They may be used either singly or in combination. Particularly preferred is combined use of a silicate compound (such as calcium ion exchanged silicate) and a phosphate compound, a phosphite compound or a polyphosphate compound (such as aluminum tripolyphosphate). Use of the silicate compound and (phosphate compound, phosphite compound or polyphosphate compound) at a weight ratio of from 0.5 to 9.5:9.5 to 0.5 (more preferably, 1:9 to 9:1) is recommended. Both of corrosion resistance and formability can be attained by controlling the ratio within the above-described range.

These antirust agents may be used for the above-described surface treatment.

The corrosion resistance can be attained by the use of an antirust agent but addition of it is known to lower the formability. In the present invention, the resin and crosslinking agent as constituent components of the thermal radiative coating are carefully combined. Use of an epoxy-modified polyester resin and/or a polyester resin having a phenol derivative introduced in the main chain thereof and a crosslinking agent (preferably an isocyanate resin and/or a melamine resin, more preferably use of both) is recommended.

Of these, the epoxy-modified polyester resin and the polyester resin having a phenol derivative introduced in the main chain thereof (for example, a polyester resin having bisphenol A introduced into the main chain thereof) are superior in corrosion resistance and adhesion of coating to polyester resins.

The isocyanate crosslinking agent improves formability (meaning an improved appearance after processing and in the below-described examples, it is evaluated by the number of cracks in the bend adhesion test) and it contributes to maintain excellent formability which will otherwise be deteriorated by the addition of an antirust agent.

The excellent corrosion resistance of the melamine crosslinking agent has been revealed from the investigations of the present inventors. Accordingly, combined use of it with the above-described antirust agent attains extremely good corrosion resistance.

In the present invention, the isocyanate crosslinking agent and the melamine crosslinking agent may be used either singly or in combination and formability and corrosion resistance can be improved further in the latter case. Specifically, addition of the melamine resin in an amount of from 5 to 80 parts by weight based on 100 parts by weight of the isocyanate resin is recommended. When the amount of the melamine resin is less than 5 parts by weight, corrosion resistance does not reach the desired level. When the amount of the melamine resin exceeds 80 parts by weight, on the other hand, effects of the isocyanate resin do not appear well, leading to insufficient improvement of formability. Based on 100 parts by weight of the isocyanate resin, the melamine resin is added preferably in an amount of 10 parts by weight or greater but not greater than 40 parts by weight, more preferably 15 parts by weight or greater but not greater than 30 parts by weight.

A composition of the coating components, that is, resin, antirust agent, crosslinking agent, blackening additive and conductive filler will be described later in "coating composition".

The coated body having such a constitution is excellent in corrosion resistance, adhesion of coating and formability. With regards to the corrosion resistance, it can satisfy the requirement for the corrosion resistance as specified in JIS-Z-2371 that an area ratio of a deteriorated portion (swelling of coating, rust, or the like) in the salt spray test (72 hours) be 10% or less (preferably, 5% or less). This corrosion resistance can be improved by selecting the crosslinking agent properly (for example, adding only a melamine crosslinking agent useful for improving corrosion resistance in a predetermined amount) or adopting a double-layer coating structure, that is, a coating having another coating (transparent coating) formed thereon, for the purpose of preventing elution of an antirust agent. As a result, the coated body with a double layer coating structure can satisfy the more severe requirement in the test [salt spray test (for 120 hours) for testing corrosion resistance as specified in JIS-Z-2371] that an area ratio of a deteriorated portion be 10% or less (preferably, 5% or less).

The above-described coated body is also excellent in adhesion of coating and formability. The "adhesion of coating" and "formability" are common in the sense that they are evaluated as the "appearance after processing". In the present invention, the formability is evaluated by "the number of cracks in the bend adhesion test according to JIS K5400" (the coated body of the present invention satisfies the requirement that the number of cracks not be greater than 5, preferably 2 or less, more preferably 0 in the bend adhesion test), while the "adhesion of coating" is evaluated by the "adhesion of coating at a bent portion".

When good electric conductivity is desired as well as the above-described characteristics (corrosion resistance, adhesion of coating and formability), it can be attained by the addition of a conductive filler to the coating. This makes it possible to adjust the electric resistance to 100Ω or less only. The preferred conductive fillers usable in the present invention are as described above. Addition of the conductive filler to the coating lowers corrosion resistance, but by adjusting the thickness of the coating to 2 μm or greater, both the corrosion resistance and conductivity can be attained even if it is a chromate-free coated body. The thickness of the coating is preferably 3 μm or greater, more preferably 5 μm or greater. It is, on the other hand, recommended to control the upper limit to 12 μm (more preferably, 10 μm) as described above.

A description was made on the coated body of the present invention using a metal sheet subjected to non-chromate treatment.

The coated body of the present invention so far described has a single-layer coating constitution which has a coating formed on a substrate. The present invention embraces the double-layer coating structure. Particularly in the present invention, when a black coating is used in order to impart the coated body with scratch resistance and fingerprint resistance, adoption of a double-layer coating constitution, that is, the black coating having a transparent film applied thereon is recommended. The black coating is coated in black which is a dark color so that a fingerprint is apparent when the coated body is treated by hands. This lowers the quality of appearance. The formation of a transparent coating however improves fingerprint resistance. Another merit is that when the black coating is scratched, a transparent coating thereover obscures the scratch.

Although it is important to control the thickness of a transparent coating in order to improve the scratch resistance and fingerprint resistance while maintaining the desired characteristics (thermal radiation property/self cooling property), a preferred range of the thickness of the transparent coating varies when the coated body is imparted with excellent conductivity in addition to the thermal radiation property.

In the case of a coated body having a coating without a conductive filler, it is recommended to adjust the thickness of the transparent coating to 0.1 to 10 μm in order to improve the scratch resistance and fingerprint resistance while maintaining excellent thermal radiation property/self cooling property. When the thickness is less than 0.1 μm, the resulting transparent coating cannot bring about effects for improving the scratch resistance and fingerprint resistance. The thickness is preferably 0.2 μm or greater, more preferably 0.3 μm or greater. The upper limit of the thickness is desirably set at 10 μm, because at a thickness exceeding 10 μm, improvement of scratch resistance and the like is saturated and the cost for the coating wastefully increases. The upper limit of the coating is more preferably 8 μm, still more preferably 7 μm.

In the case of a coated body having a coating with a conductive filler, on the other hand, it is necessary to improve the scratch resistance and fingerprint resistance while keeping good electric conductivity as well as excellent thermal radiation property/self cooling property. For this purpose, adjustment of the thickness of the transparent coating to 0.1 to 3.0 μm is recommended. When the thickness is less than 0.1 μm, effects for improving the scratch resistance and fingerprint resistance are not available. The thickness is more preferably 0.2 μm or greater, more preferably, 0.3 μm or greater. Too thick coating adversely affects the electric conductivity so that the upper limit is preferably set at 3.0 μm, more preferably 2.0 μm, still more preferably 1.5 μm.

The formation of the double-layer coating structure having a transparent coating stacked over a first coating is effective for drastically improving the scratch resistance compared with that of a single-layer coating structure and at the same time, improving the fingerprint resistance which cannot be attained by the above-described single-layer coating structure.

There is no particular limitation imposed on the resin constituting the above-described transparent coating and all the resins capable of forming a transparent coating are embraced. Specific examples include acrylic resins, urethane resins, polyolefin resins, polyester resins, fluorine resins and silicone resins, and mixed resins and modified resins thereof. Within an extent not damaging the effects of the present invention, additives such as crosslinking agents, waxes and matting agents may be added to the transparent coating. This makes it possible to easily control the lubricity or strength of the coating, leading to further improvement in the scratch resistance. No particular limitation is imposed on the additive usable in the present invention insofar as it is usually added to a coating and is capable of exhibiting the above-described effects effectively. Examples include crosslinking agents such as melamine and blocked isocyanate ones.

As described above, a coated body having a multilayer coating structure which has, as another coating, a coating other than a transparent coating is embraced in the present invention. In this case, a pigment such as coloring pigment can be added to the resin and additives constituting the transparent coating.

In the present invention, a coating composition obtained by adding over 3 parts by weight of a blackening additive and 10 to 50 parts by weight of a conductive filler to the coating forming components is also embraced within the scope of the present invention. The requirements for the blackening additive (preferably, carbon black having an average particle size adjusted to fall within a range of from 5 to 100 nm; the relationship between the content and the thickness of the coating satisfying the above-described equation is recommended) and the requirements for the conductive filler (preferably, Ni) were already described above. Use of the coating composition of the present invention enables to form a coating excellent in thermal radiation property and electric conductivity so that the composition can be used preferably as a coating composition for obtaining a coated body for members of an electronic device.

As a coating composition to be applied to a substrate subjected to chromate-free surface treatment, the coating composition containing 35 parts by weight or greater (preferably, 40 parts by weight or greater, more preferably 45 parts by weight or greater) of an epoxy-modified polyester resin and/or a polyester resin having a phenol derivative introduced in the main chain thereof, 2 to 25 parts by weight (preferably 3 parts by weight or greater but not greater than 20 parts by weight, more preferably 4 parts by weight or greater but not greater than 15 parts by weight) of an antirust agent, 1 to 20 parts by weight (preferably 2 parts by weight or greater but not greater than 18 parts by weight, more preferably 3 parts by weight or greater but not greater than 15 parts by weight) of a crosslinking agent, over 3 parts by weight of a blackening additive, and 10 to 50 parts by weight of a conductive filler is also embraced in the present invention. Of these, preferred requirements for the crosslinking agent (preferably, having, relative to 100 parts by weight of an isocyanate crosslinking agent, 5 to 80 parts by weight of a melamine crosslinking agent incorporated as a mixture), preferred requirements for the blackening additive and preferred requirements for the conductive filler are as described above. Use of the coating composition of the present invention enables the formation of a chromate-free coating excellent in thermal radiation property, electric conductivity, corrosion resistance, adhesion of coating and formability so that the composition can be used suitably for obtaining a coated body, particularly, a chromate-free coated body for the members of an electronic device.

Next, a process for preparing the coated body of the present invention will be described. The coated body of the present invention can be prepared by applying a coating containing the above-described components to the surface of a substrate by a known coating method and then drying. No particular limitation is imposed on the coating method. Examples include a method of cleansing the surface of a long metal strip, subjecting the resulting metal strip to pre-coating treatment (for example, phosphate or chromate treatment) as needed, applying a coating to the surface by roll coating, spraying or curtain flow coating and then drying the resulting metal strip by allowing it to pass through a hot air drying furnace. In consideration of uniform thickness of the coating, treatment cost, and coating efficiency totally, roll coating is preferred for practical use.

When a metal sheet coated with a resin is employed as the substrate, it may be subjected to phosphate treatment or chromate treatment as pre-coating treatment in order to improve adhesion with a resin coating or corrosion resistance. Upon chromate treatment, a Cr deposition amount is preferably controlled to 35 mg/m$^2$ or less in view of chromium elution during use of the resin coated body. Within the above-described range, chromium elution from the underlying chromated layer can be suppressed. In the case of the conventional chromated material, water resistant adhesion of the top coat formed as needed tends to lower under wet environment owing to the elution of hexavalent chromium. In the above-described metal sheet, on the other hand, elution therefrom is suppressed so that no deterioration in water resistant adhesion of the top coat occurs.

A non-chromate type coated body is available by conducting the above-described chromate-free surface treatment by a roll coating method, spray method, dipping treatment or the like.

The present invention also embraces parts of an electronic device which has, in a closed space thereof, a heating element and whose cabinet wall is wholly or partially made of the above-described coated body for members of an electronic device. Examples of the parts of an electronic device include information recording products such as CD, LD, DVD, CD-ROM, CD-RAM, PDP and LCD, electric, electronic or communication related products such as personal computer, car navigation unit and car AV equipment, audio video equipment such as projector, television, video and game machine, copying machines, printers, power supply box covers of air conditioner outdoor unit, control box covers, automatic vending machines and refrigerators.

The present invention further pertains to a thermal radiation property evaluating device for evaluating the thermal radiation property of a test plate. It embraces a thermal radiation property evaluating device, which device has a heating element disposed on a cabinet which has a ceiling surface wholly or partially made of the test plate, and a side surface and bottom surface, each made of a heat insulating material, and a thermometer disposed at the substantial center of the cabinet. Its typical example is shown in FIG. 1. In a preferred embodiment, a protective member is disposed above the test plate for blocking it from outside atmospheric conditions, whereby stable data are available.

Figure 8:
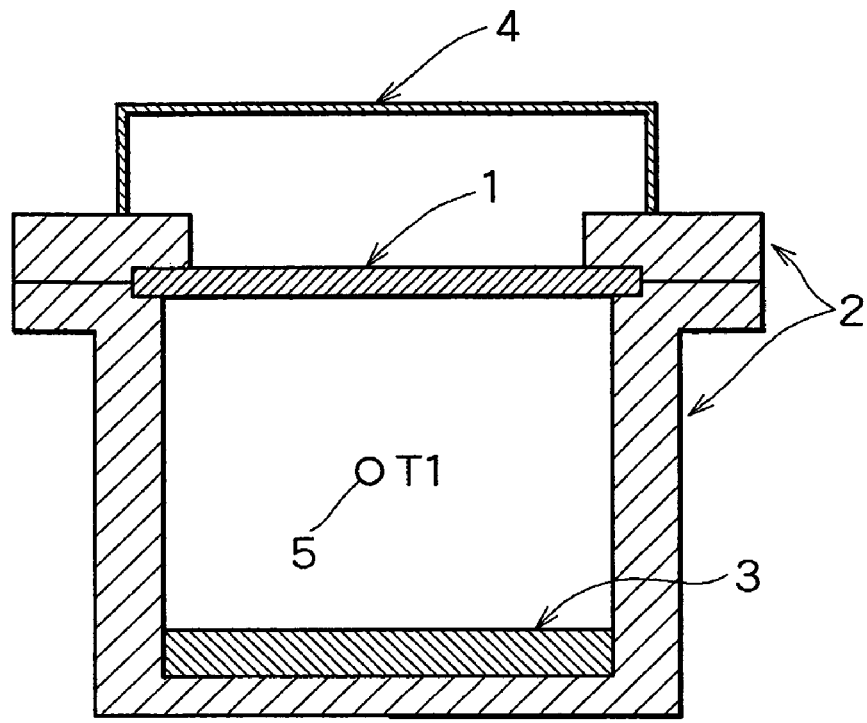
FIG. 8 is a schematic view of a thermal radiation property evaluating apparatus which is partially covered with a protective member.
Figure 9:
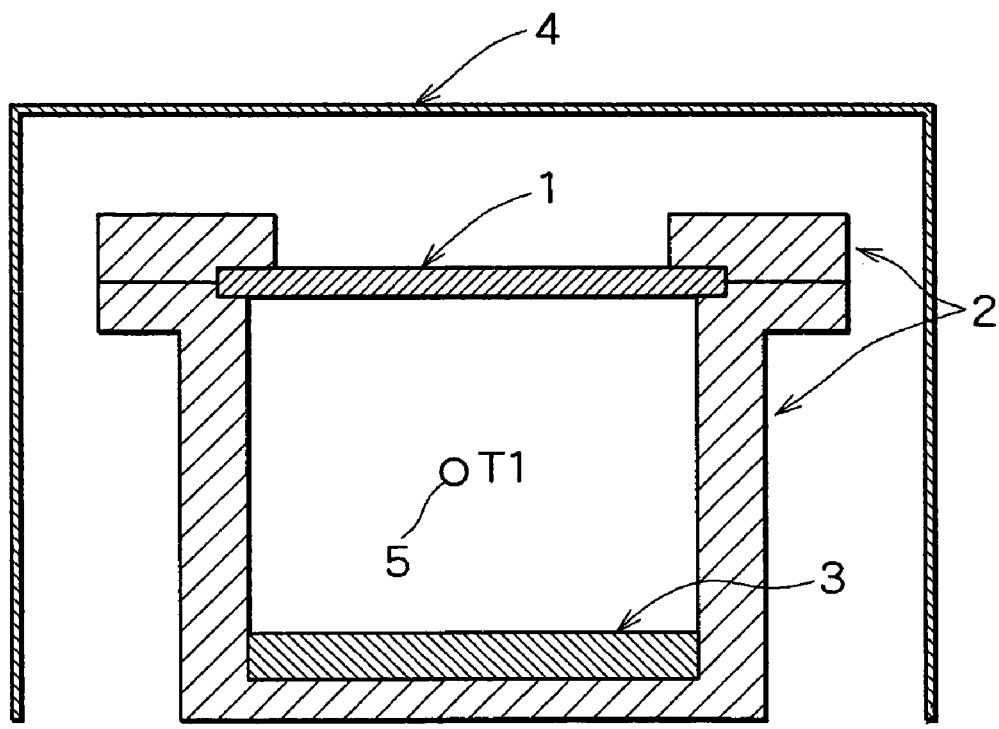
FIG. 9 is a schematic view of a thermal radiation property evaluating apparatus which is covered wholly with a protective member.

Typical examples of such a device are shown in FIGS. 8 and 9. FIG. 8 is a schematic view of a thermal radiation property evaluating apparatus having a box covered, at the upper portion thereof, with a protective member; and FIG. 9 is a schematic view of a thermal radiation property evaluating apparatus having a cabinet covered wholly with a protective member. The apparatus shown in FIG. 9 is useful, because the influence of the outside air can be blocked completely. These apparatuses are offered only by way of typical example and not by way of limitation.

In these diagrams, indicated at numeral 1 is a test plate (a sample whose thermal radiation property is to be evaluated), 2 a heat insulating material, 3 a heating element, 4, a protective member (cover) and 5, a thermometer. The thermal radiation property evaluation apparatus of the present invention has a box-like structure. Its side surface and bottom surface are made of the heat insulating material 2. On the bottom of the box, the heating element 3 and at the substantial center inside of the box, the thermometer 5 are disposed. The outside of the apparatus is covered with the protective member 4. When measurement is conducted under predetermined outside air conditions, the protective member is not necessary. Such an embodiment is illustrated in FIG. 1. No particular limitation is imposed on the protective member insofar as it is capable of blocking the outside air. For example, plastic, wooden material or metal material is used as it.

Figure 10:
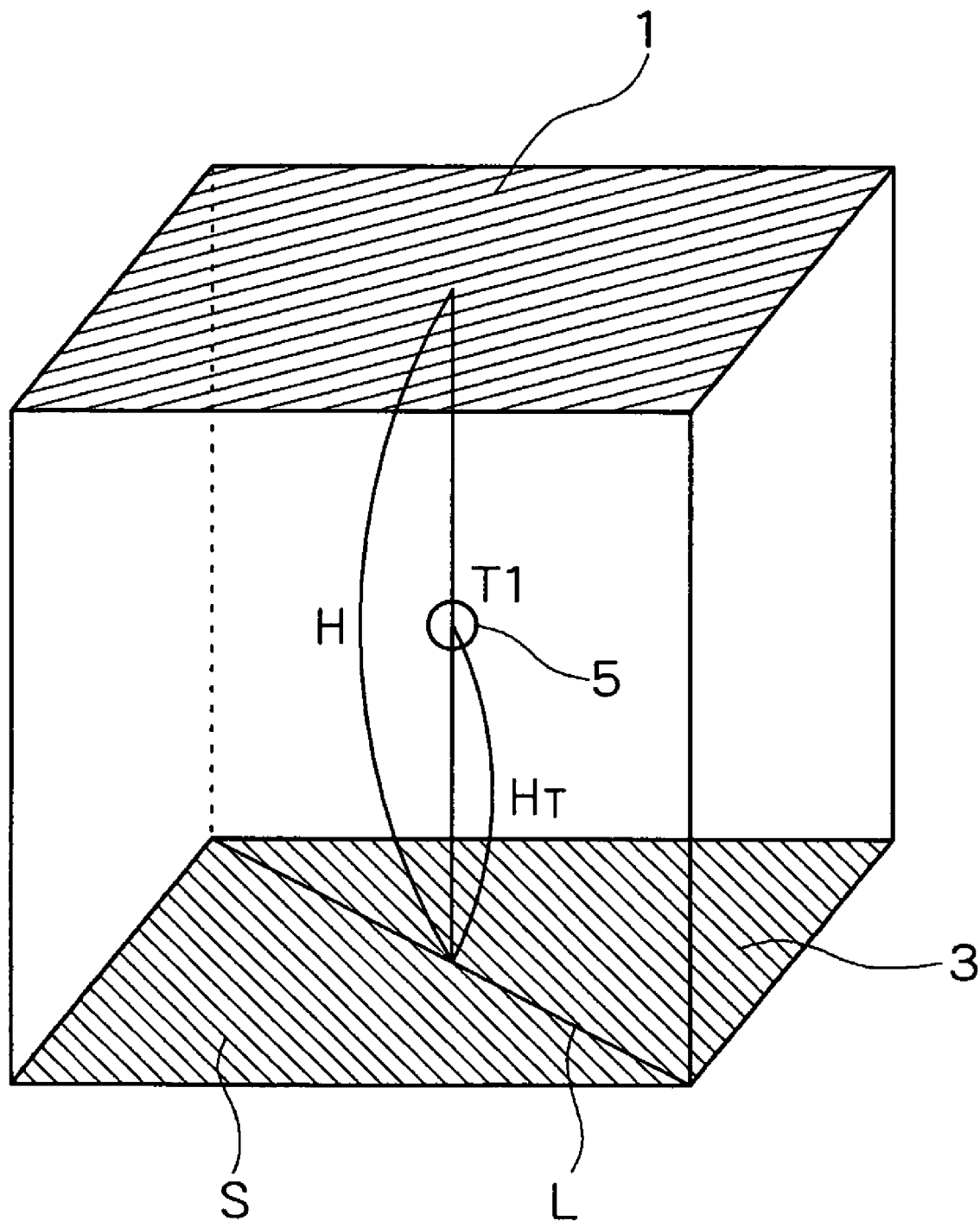
FIG. 10 is a schematic view illustrating a desired portion of a thermometer used in the invention apparatus.

The thermometer 5 is a tool for measuring the atmospheric temperature inside of the device. In order to precisely measure the temperature, its position must be controlled appropriately. More specifically, it is recommended to satisfy the following relationships: L/H=0.7 to 2.8, S/H$^2$=0.25 to 4 and H$_T$/H=0.3 to 0.7, supposing that a straight line (mm) which can be drawn as long as possible in the heating element 3 disposed on the bottom surface is L, the bottom area (mm$^2$) of the heating element 3 is S, the height (mm) from the heating element 3 to the thermometer 5 is H$_T$, and the height (mm) from the heating element 3 to the test plate 1 is H. Outside the above-described range, the accuracy of the data lowers. For reference, the relationship among L, S, H$_T$ and H is shown in FIG. 10.

The present invention will hereinafter be described in detail by Examples. The present invention is not limited by these Examples. Changes or modifications made within an extent not departing from the scope of the present invention are all embraced by the present invention.

EXAMPLES

In Examples 1 to 4, evaluation results of various properties, mainly thermal radiation property, of the first/third coated body according to the present invention will be described. Of these, evaluation in Examples 1 to 3 was made on a coated body obtained by applying, to the surface side and back side of a substrate, the same amount of a coating to form thereon thermal radiative coatings of the same thickness, while evaluation in Example 4 was made on a coated body obtained by applying, to the surface side and back side of a substrate, coatings different in kind, amount or the like, thereby forming thereon thermal radiative coatings different in emissivity.

Example 1

Evaluation of Thermal Radiation Property of the First Coated Body (Free of a Conductive Filler)

In this Example, the thermal radiation property of the first coated body according to the present invention was evaluated.

An electro galvanized steel plate (thickness: 0.6 mm) was used as a substrate. To each of the surface side and back side thereof, a coating (using a polyester resin as a base resin and a melamine resin as a crosslinking agent) added with a predetermined amount of carbon black (average particle size: 25 nm) as shown in Table 1 was applied, followed by baking and drying, whereby each of Samples Nos. 1 to 23 (120×150 mm) was prepared. For comparison, a substrate without coating was prepared in a similar manner.

Each of the samples thus prepared was measured for integrated emissivity at infrared wavelength (4.5 to 15.4 μm) and ΔT1 [a difference in temperature when each of Samples Nos. 1 to 32 was used and that when the sample of Comparative Example (coating-free substrate) was used]. The infrared emissivity includes both the data when the sample was heated at 100° C. and 200° C., respectively.

The greater ΔT1, the better thermal radiation property. The thermal radiation property was subjected to relative evaluation based on the below-described criteria. It is to be noted that in the first coated body according to the present invention, the coated bodies ranked as A and B are evaluated as "coated body exhibiting excellent thermal radiation property".

A: 3.5≦ΔT1
B: 2.7≦ΔT1<3.5
C: 1.5≦ΔT1<2.7
D: 1.0≦ΔT1<1.5
E: ΔT1<1.0

Figure 11:
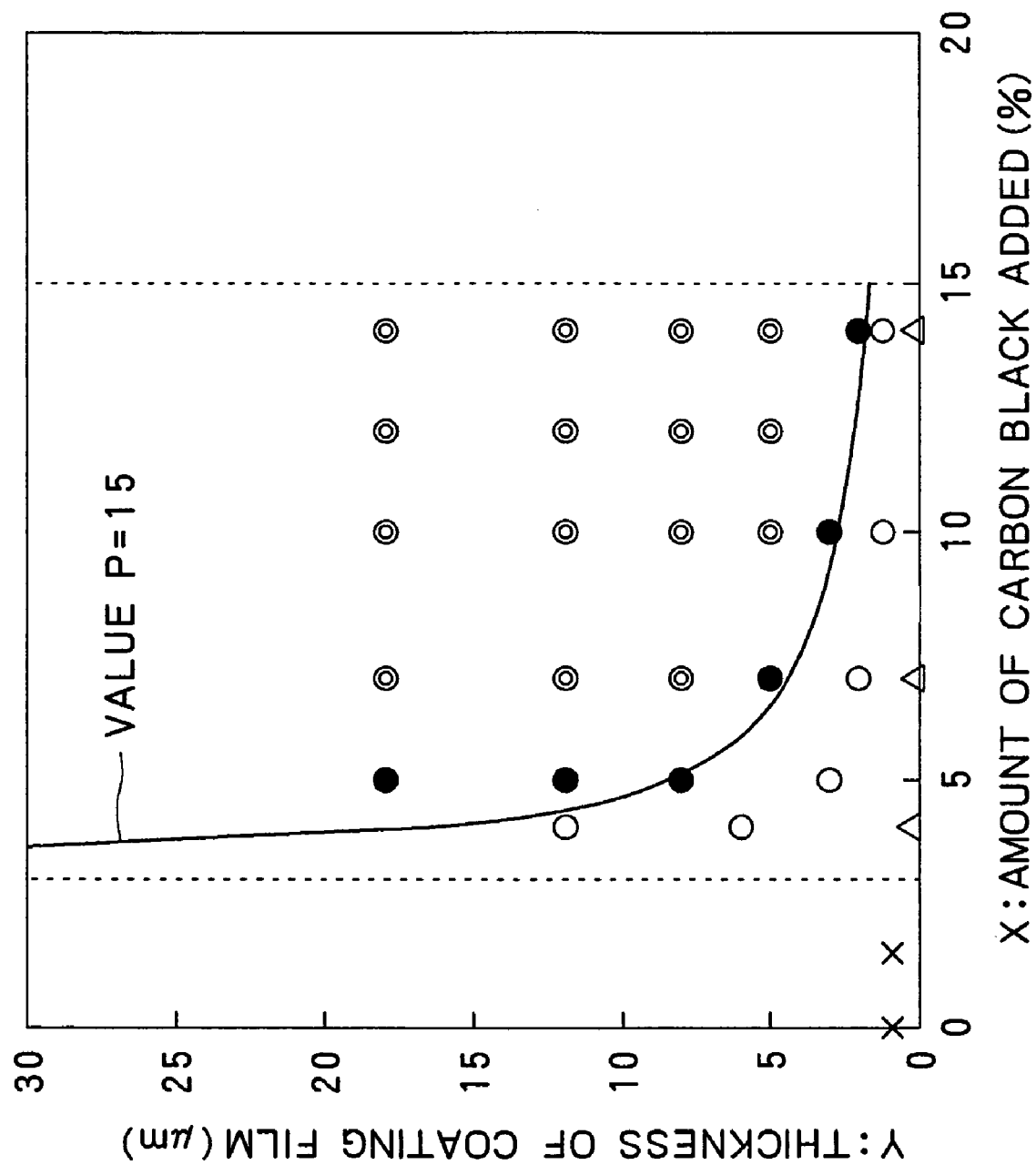
FIG. 11 is a graph showing the relationship between the content (X) of carbon black and film thickness (Y) in Example 1.
Figure 12:
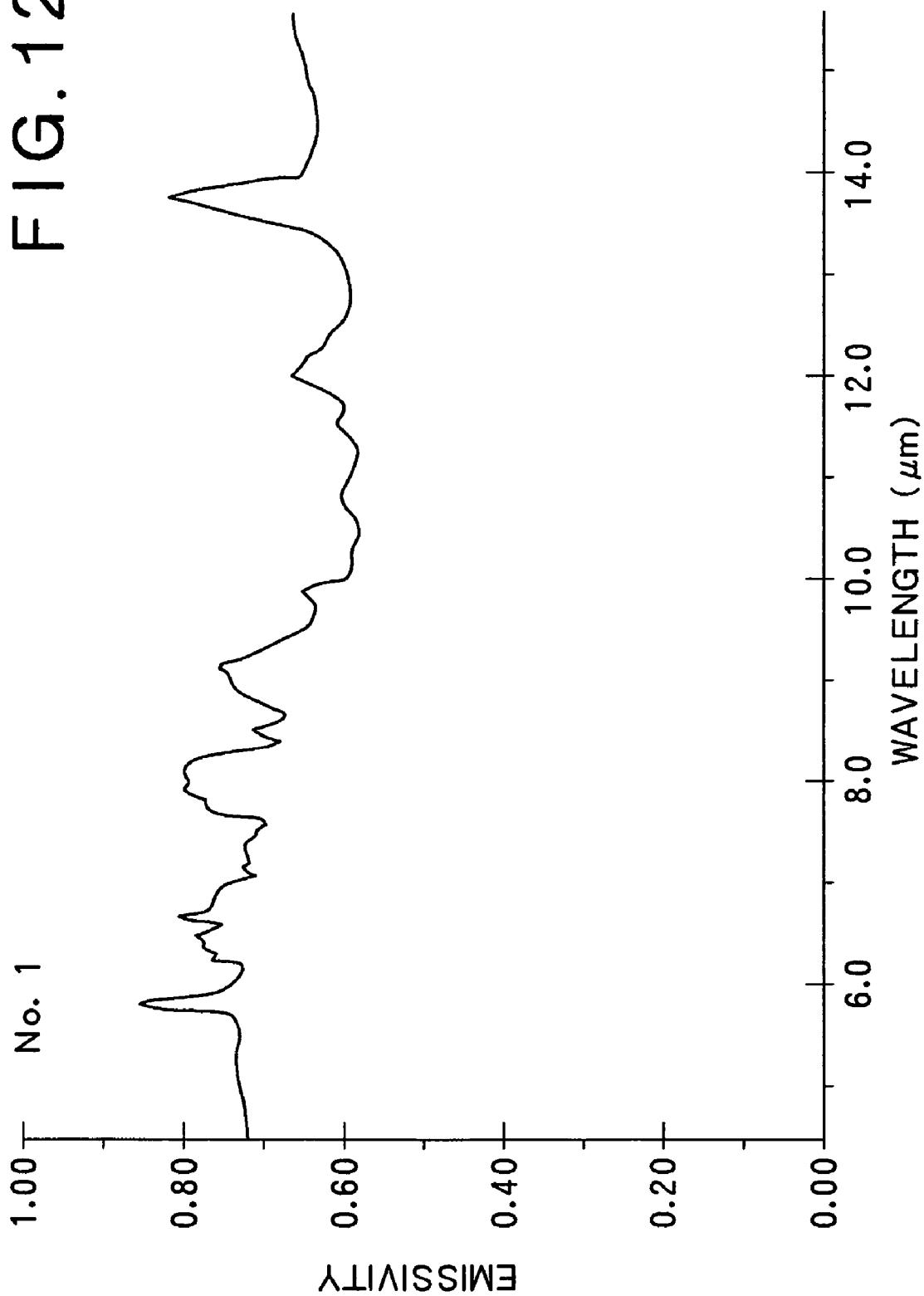
FIG. 12 is a graph showing the relationship between the infrared wavelength and emissivity of Sample No. 1 in Example 2.
Figure 13:
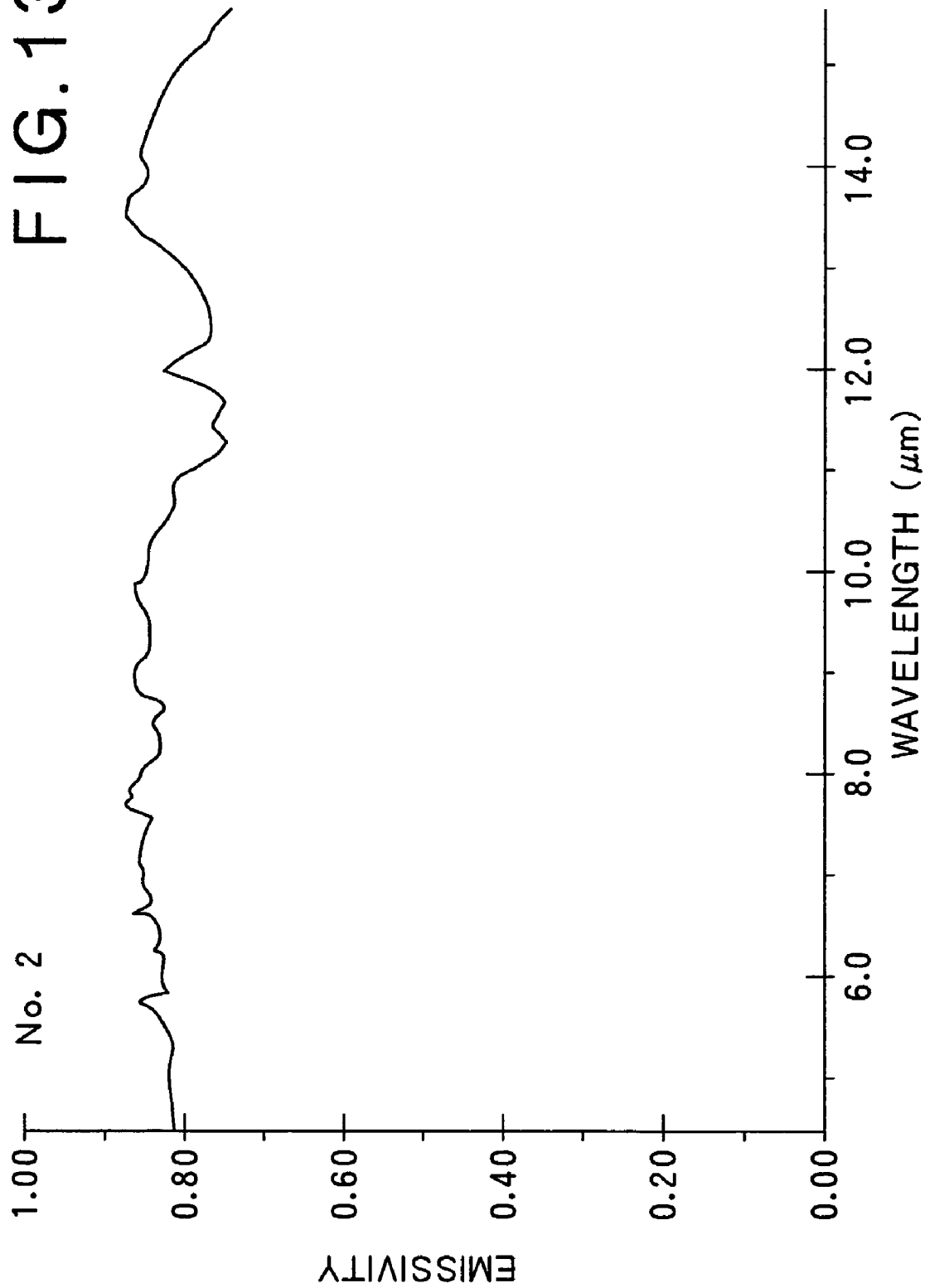
FIG. 13 is a graph showing the relationship between the infrared wavelength and emissivity of Sample No. 2 in Example 2.

The evaluation results are shown in Table 1, and in FIG. 11, a relationship between the amount (X) of carbon black and coating thickness (Y) is shown in a graph. In the graph, A, B, C, D, E have the same meanings as the above-described criteria.

TABLE 1

| | | | | Emissivity | | | | Thermal radiation property | |
|---|---|---|---|---|---|---|---|---|---|
| | | | | both sides | | a × b | | ΔT1 | Relative |
| No. | X (%) | Y (μm) | Value P | 100° C. | 200° C. | 100° C. | 200° C. | (° C.) | evaluation |
| 1 | 0 | 1 | −1.5 | 0.10 | 0.11 | 0.01 | 0.01 | 0.5 | E |
| 2 | 1.5 | 1 | −0.75 | 0.15 | 0.15 | 0.02 | 0.02 | 0.8 | E |
| 3 | 5.0 | 8.0 | 15 | 0.75 | 0.77 | 0.56 | 0.59 | 3.3 | B |
| 4 | 5.0 | 12 | 23 | 0.79 | 0.81 | 0.62 | 0.66 | 3.4 | B |
| 5 | 5.0 | 18 | 35 | 0.78 | 0.81 | 0.61 | 0.66 | 3.4 | B |
| 6 | 7.0 | 5.0 | 18 | 0.74 | 0.75 | 0.55 | 0.56 | 3.4 | B |
| 7 | 7.0 | 8.0 | 30 | 0.80 | 0.81 | 0.64 | 0.66 | 3.6 | A |
| 8 | 7.0 | 12 | 46 | 0.81 | 0.83 | 0.66 | 0.69 | 3.7 | A |
| 9 | 7.0 | 18 | 70 | 0.82 | 0.84 | 0.67 | 0.71 | 3.8 | A |
| 10 | 10 | 3.0 | 17.5 | 0.65 | 0.66 | 0.42 | 0.44 | 2.7 | B |
| 11 | 10 | 5.0 | 31.5 | 0.80 | 0.81 | 0.64 | 0.66 | 3.5 | A |
| 12 | 10 | 8.0 | 52.5 | 0.80 | 0.82 | 0.64 | 0.67 | 3.7 | A |

TABLE 1-continued

| | | | | Emissivity | | | | Thermal radiation property | |
|---|---|---|---|---|---|---|---|---|---|
| | | | | both sides | | a × b | | ΔT1 | Relative |
| No. | X (%) | Y (μm) | Value P | 100° C. | 200° C. | 100° C. | 200° C. | (° C.) | evaluation |
| 13 | 10 | 12 | 80.5 | 0.83 | 0.85 | 0.69 | 0.72 | 3.8 | A |
| 14 | 10 | 18 | 122.5 | 0.86 | 0.88 | 0.74 | 0.77 | 3.9 | A |
| 15 | 12 | 5.0 | 40.5 | 0.80 | 0.80 | 0.64 | 0.64 | 3.6 | A |
| 16 | 12 | 8.0 | 67.5 | 0.81 | 0.82 | 0.66 | 0.67 | 3.8 | A |
| 17 | 12 | 12 | 103.5 | 0.83 | 0.85 | 0.69 | 0.72 | 3.8 | A |
| 18 | 12 | 18 | 157.5 | 0.83 | 0.86 | 0.69 | 0.74 | 3.9 | A |
| 19 | 14 | 2.0 | 16.5 | 0.70 | 0.72 | 0.49 | 0.52 | 3.3 | B |
| 20 | 14 | 5.0 | 49.5 | 0.80 | 0.81 | 0.64 | 0.66 | 3.8 | A |
| 21 | 14 | 8.0 | 82.5 | 0.81 | 0.84 | 0.66 | 0.71 | 3.8 | A |
| 22 | 14 | 12 | 126.5 | 0.84 | 0.86 | 0.71 | 0.74 | 3.9 | A |
| 23 | 14 | 18 | 192.5 | 0.86 | 0.88 | 0.74 | 0.77 | 4.0 | A |

Note:
X = Amount of carbon black added (mass %)
Y = Coating thickness (μm)
Value P = (X − 3) × (Y − 0.5)

Table 1 suggests that the coated bodies (Nos. 1 and 2) which do not satisfy the requirements of the present invention are inferior in thermal radiation property, while those (Nos. 3 to 23) satisfy the requirements of the present invention are each excellent in thermal radiation property.

It has been confirmed that in the case where the content X of carbon black is set at 18%, which is greater than the desired range (less than 15%) of the present invention, even if the coating thickness Y is increased to 1, 10 or 18 μm to control the above-described equation (2) within the following range: $[(X-3) \times (Y=0.5) \geq 15]$, marked coating unevenness occurs and uniform application cannot be attained easily.

Example 2

Evaluation of Thermal Radiation Property and Electric Conductivity of the Third Coated Body (Added with a Conductive Filler)

In a similar manner to Example 1 except that the coating as shown in Table 1 was replaced with a coating (a) (having a similar resin composition to Example 1), samples Nos. 1 and 2 (120×150 mm) were prepared.

Coating (a) (Added with a Conductive Filler):

The resin as described in Example 1: 65%

As a blackening additive, carbon black having an average grain size of 25 nm: 10%

As a conductive filler, Ni in the scaly form (having a thickness of 1 μm and size of 15 to 20 μm): 25%.

Samples thus prepared were measured for integrated emissivity at infrared wavelength (4.5 to 15.4 μm), range of change in emissivity, ΔT1 and electric resistance (electric conductivity) in the above-described manner.

As the conventional steel plate, used was a Zn—Ni alloy coated steel plate (No. 3 in Table 2) having, formed both sides thereof, a blackened coating and, formed only on the blackened coating over the surface side, a transparent coating and various properties were evaluated as described above. This steel plate was obtained by electrolysis of plating upon formation of a blackened coating.

For comparison, various properties of a substrate without coating were also evaluated (No. 4 in Table 2).

The results are shown in Table 2. In FIGS. 12 to 15, the relationship between the wavelength of the infrared ray and the infrared emissivity of samples of Nos. 1, 2, 3 and 4 is shown in graph, respectively.

TABLE 2

| | | | | | | Infrared emissivity | | | | | | | Electric |
|---|---|---|---|---|---|---|---|---|---|---|---|---|---|
| | | | X | Y | | Both sides | | a × b | | A − B | | | conductivity |
| No. | Substrate | Coating | (%) | (μm) | Value P | 100° C. | 200° C. | 100° C. | 200° C. | 100° C. | 200° C. | ΔT1 | (Ω) |
| 1 | A | Coating (a) | 10 | 5 | 31.5 | 0.70 | 0.71 | 0.49 | 0.50 | 0.27 | 0.28 | 3.5 | 1-3 |
| 2 | A | Coating (a) | 10 | 8 | 52.5 | 0.83 | 0.84 | 0.69 | 0.71 | 0.14 | 0.16 | 3.7 | 1-3 |
| 3 | B | Transparent coating | — | 1.5 | — | 0.57 | 0.58 | 0.32 | 0.34 | 0.48 | 0.50 | 0.5 | 100-10$^4$ |
| 4 | A | — | — | — | — | 0.04 | 0.05 | 0.0016 | 0.0025 | 0.01 | 0.01 | 0 | 0.01-0.1 |

Note:
Substrate A: Electro galvanized steel plate
Substrate B: Blackened Zn—Ni alloy coated steel plate
X = amount of carbon black added (mass %)
Y = coating thickness (μm)
P = (X − 3) × (Y − 0.5)

From Table 2 and the above-described diagrams, it has been found that the coated bodies (Nos. 1 and 2) satisfying the requirements of the present invention are all satisfactory in infrared emissivity, range in change of emissivity and ΔT1, thus are excellent in thermal radiation property.

Sample No. 3, which uses a conventional black steel sheet (blackened without using a blackening additive such as carbon black), on the other hand, exhibits neither desired thermal radiation property nor desired electric conductivity, because no blackening additive is used for it and it is free of a conductive filler.

The product of infrared emissivities of a substrate (No. 4) without coating is 0.0016, suggesting that it has no thermal radiation property.

Example 3

Evaluation of Thermal Radiation Property, Electric Conductivity, Fingerprint Resistance and Scratch Resistance of the First and Third Coated Bodies In this Example, tests were conducted in order to confirm improvement in fingerprint resistance and scratch resistance brought by the formation of a transparent coating and improvement in electric conductivity brought by the addition of a conductive filler.

Described specifically, samples Nos. 1 to 11 (120×150 mm) (free of a transparent coating) in Table 3 were prepared by using an electro galvanized steel plate (thickness: 0.6 mm) as a substrate; applying, onto the surface side and back side thereof, the same amount of coatings (using a polyester resin as a base resin and a melamine resin as a crosslinking agent) added with carbon black having various average particle sizes as shown in Table 3 [the content (X): 10 to 12%, in any case] and 0 to 40% of scaly Ni (thickness: 1 μm, width: 15 to 20 μm) as an undercoating; baking and drying the resulting substrate.

In order to confirm improvement in scratch resistance and fingerprint resistance by the formation of a transparent coating, samples Nos. 12 to 22 (120×150 mm) as shown in Table 3 were prepared (samples with a transparent coating) by applying a clear polyester resin to the above-described substrates which have finished undercoating. Of these, the samples Nos. 12 to 14 are free of Ni as a conductive filler.

The samples thus prepared were evaluated for thermal radiation property and electric conductivity in a similar manner to those employed in Example 1 and for fingerprint resistance and scratch resistance in accordance with the below-described manner. The electric conductivity was subjected to relative evaluation based on the following criteria:

A: excellent: resistance not greater than 10Ω
B: good: resistance of 10 to 100Ω
C: poor: resistance exceeding 100Ω

[Scratch Resistance]

A press test using a cylindrical forming press having a blank diameter of 110 mm and a punch diameter of about 50 mm was conducted. The scratches on the sliding portion of each sample were visually observed and evaluated based on the below-described criteria. Upon the test, the punch diameter was adjusted so that the clearance of the mold would become +40 μ. The pressing was conducted under the conditions of a speed of 40 spm and punch R of 0.5 mm.

A: good (no change in appearance)
B: slight scratches
C: marked scratches

[Fingerprint Resistance]

A finger was pressed against the surface of each sample for 1 second and the fingerprint was visually evaluated based on the following criteria:

A: no fingerprint is found
B: slight fingerprint exists
C: marked fingerprint exists The evaluation results are shown in Table 3. It should be noted that [−] in the table means that each property was not evaluated because no conductive filler was added or no transparent coating was formed.

TABLE 3

| | Carbon black | | | | | Emissivity | | | | Thermal radiation property | |
| | mean particle size | X | Y | | both sides | | a × b | | ΔT1 | Relative |
| No. | (nm) | (%) | (μm) | Value P | 100° C. | 200° C. | 100° C. | 200° C. | (° C.) | evaluation |
|---|---|---|---|---|---|---|---|---|---|---|
| 1 | 17 | 10 | 8 | 52.5 | 0.79 | 0.80 | 0.62 | 0.64 | 3.7 | B |
| 2 | 55 | 10 | 8 | 52.5 | 0.79 | 0.80 | 0.62 | 0.64 | 3.7 | A |
| 3 | 25 | 10 | 5 | 31.5 | 0.80 | 0.81 | 0.64 | 0.66 | 3.5 | A |
| 4 | 25 | 10 | 5 | 31.5 | 0.78 | 0.80 | 0.61 | 0.64 | 3.5 | A |
| 5 | 25 | 10 | 5 | 31.5 | 0.77 | 0.79 | 0.59 | 0.62 | 3.5 | A |
| 6 | 25 | 12 | 5 | 40.5 | 0.79 | 0.81 | 0.62 | 0.66 | 3.6 | A |
| 7 | 25 | 12 | 5 | 40.5 | 0.79 | 0.80 | 0.62 | 0.64 | 3.5 | A |
| 8 | 25 | 12 | 5 | 40.5 | 0.79 | 0.80 | 0.62 | 0.64 | 3.5 | A |
| 9 | 25 | 10 | 8 | 52.5 | 0.82 | 0.84 | 0.67 | 0.71 | 3.7 | A |
| 10 | 25 | 10 | 10 | 66.5 | 0.83 | 0.85 | 0.69 | 0.72 | 3.8 | A |
| 11 | 25 | 10 | 20 | 136.5 | 0.85 | 0.87 | 0.72 | 0.76 | 3.9 | A |
| 12 | 25 | 10 | 5 | 31.5 | 0.79 | 0.81 | 0.62 | 0.66 | 3.5 | A |
| 13 | 25 | 10 | 5 | 31.5 | 0.80 | 0.82 | 0.64 | 0.67 | 3.5 | A |
| 14 | 25 | 10 | 5 | 31.5 | 0.79 | 0.82 | 0.62 | 0.67 | 3.5 | A |
| 15 | 25 | 10 | 5 | 31.5 | 0.80 | 0.82 | 0.64 | 0.67 | 3.5 | A |
| 16 | 25 | 10 | 5 | 31.5 | 0.80 | 0.82 | 0.64 | 0.67 | 3.6 | A |
| 17 | 25 | 10 | 5 | 31.5 | 0.80 | 0.82 | 0.64 | 0.67 | 3.6 | A |
| 18 | 25 | 10 | 5 | 31.5 | 0.79 | 0.82 | 0.62 | 0.67 | 3.6 | A |
| 19 | 25 | 10 | 5 | 31.5 | 0.81 | 0.83 | 0.66 | 0.69 | 3.6 | A |
| 20 | 25 | 10 | 5 | 31.5 | 0.80 | 0.82 | 0.64 | 0.67 | 3.5 | A |

TABLE 3-continued

| 21 | 25 | 10 | 5 | 31.5 | 0.78 | 0.80 | 0.61 | 0.64 | 3.5 | A |
| 22 | 25 | 10 | 5 | 31.5 | 0.77 | 0.79 | 0.59 | 0.62 | 3.5 | A |

| No. | Ni amount (%) | Electric conductivity ($\Omega$) Side A/Side B | Relative evaluation | Transparent coating (μm) | Evaluation of fingerprint resistance | Evaluation of scratch resistance |
|---|---|---|---|---|---|---|
| 1 | — | $10^6$ or greater | C | — | — | — |
| 2 | — | $10^6$ or greater | C | — | — | — |
| 3 | 20 | 1-10 | A | — | — | — |
| 4 | 30 | 1-10 | A | — | — | — |
| 5 | 40 | 1-10 | A | — | — | — |
| 6 | 20 | 1-10 | A | — | — | — |
| 7 | 30 | 1-10 | A | — | — | — |
| 8 | 40 | 1-10 | A | — | — | — |
| 9 | 30 | 1-10 | A | — | — | — |
| 10 | 30 | 10-100 | B | — | — | — |
| 11 | 30 | $10^6$ or greater | C | — | — | — |
| 12 | — | $10^6$ or greater | C | 1.0 | A | A |
| 13 | — | $10^6$ or greater | C | 5.0 | A | A |
| 14 | — | $10^6$ or greater | C | 8.0 | A | A |
| 15 | 30 | 1-10 | A | 0.3 | B | B |
| 16 | 30 | 1-10 | A | 1.0 | A | A |
| 17 | 30 | 1-10 | A | 1.5 | A | A |
| 18 | 30 | 10-100 | B | 2.0 | A | A |
| 19 | 30 | $10^6$ or greater | C | 5.0 | A | A |
| 20 | 30 | 1-10 | A | 0.05 | C | C |
| 21 | 10 | $10^6$ or greater | C | 0.3 | B | A |
| 22 | 60 | 1-3 | A | 0.3 | B | B |

Note:
X = amount of carbon black added (mass %)
Y = coating thickness (μm)
P = (X − 3) × (Y − 0.5)

Table 3 leads to the following conclusion:

Samples Nos. 1 to 2 are those free of a conductive filler (Ni) and added with blackening additives (carbon black) varied in average particle size. The average particle sizes of the additives are adjusted to fall within a desired range (5 to 100 nm) so that the samples each has good thermal radiation property.

Samples Nos. 3 to 11 are those containing carbon black and Ni in the coating. Of these, Samples Nos. 3 to 10 satisfy the requirements of the present invention so that both thermal radiation property and electric conductivity are excellent. A little inferiority in the electric conductivity of Sample No. 10 to the other samples (Nos. 3 to 9) is presumed to result from an increase in electric resistance of the coating owing to an increase in the coating thickness.

Sample No. 11, on the other hand, is low in electric conductivity, because the thickness of the black coating is outside the desired upper limit (not greater than 12 μm).

Samples Nos. 12 to 22 are those having a transparent coating formed on the black coating.

Of these, Samples Nos. 12 to 18, and 21 and 22 are excellent in both fingerprint resistance and scratch resistance, because the thickness of the transparent coating falls within the desired range of the present invention. Samples Nos. 12 to 14, and Sample No. 21 have electric conductivity lower than Samples Nos. 15 to 21 and 23 containing a conductive filler, because the former samples each contains no conductive filler, and the latter sample contains a conductive filler in an amount below the preferred lower limit of the present invention. Sample No. 22 is added with a large amount of a conductive filler. It has been confirmed that in spite of excellent electric conductivity, it is low in formability (not described in Table).

On the other hand, the electric conductivity of Sample No. 19 is lowered owing to the thickness of the transparent coating exceeding the desired range of the present invention. Sample No. 20 is low in fingerprint resistance and scratch resistance, because the thickness of a transparent coating is outside the desired lower limit of the present invention.

Example 4

Evaluation of Thermal Radiation Properties and Electric Conductivity of the First and Third Coated Bodies In this Example, the thermal radiation property and electric conductivity of each sample were measured in a similar manner to Example 1 except that the kind of the substrate, the kind of the additive, and emissivities from the surface side and back side of the substrate were changed.

Described specifically, Samples Nos. 1 to 30 each having a composition as shown in Table 4 or 5 were employed for the measurement. As a substrate, Sample No. 19 in Table 5 used a blackened Zn—Ni alloy coated steel plate, Sample No. 26 in Table 5 used an Al plate (1050); Sample No. 27 in Table 5 used a Cu plate; and the other samples used an electro galvanized steel plate. Each of these substrates has a thickness of 0.6 mm.

As in Example 1, a coating having, as a base resin, a polyester resin and, as a crosslinking agent, a melamine resin was applied to the substrate, followed by baking and drying, whereby samples (120×150 mm) in Tables 4 and 5 were prepared.

The results are shown in Tables 4 and 5. Table 4

TABLE 4

| | Surface side | | | | | | | Back side | | | | | | | | Thermal radiation |
|---|---|---|---|---|---|---|---|---|---|---|---|---|---|---|---|---|
| | Emis- | Additive | | Y | | | Electric | Emis- | Additive | | Y | Value | | Electric | | property |
| No. | sivity a | kind | Amount % | μm | Value P | Ni % | conductivity Ω | sivity a | kind | Amount % | μm | P | Ni % | conductivity Ω | a × b | ΔT1(° C.) |
| 1 | 0.86 | *1 | 14 | 18 | 192.5 | — | $10^6$< | 0.86 | *1 | 14 | 18 | 193 | — | $10^6$< | 0.74 | 4.1 |
| 2 | 0.80 | *1 | 10 | 8 | 52.5 | 30 | 1-10 | 0.84 | *1 | 14 | 12 | 127 | — | $10^6$< | 0.67 | 4.0 |
| 3 | 0.81 | *1 | 7 | 12 | 46 | — | $10^6$< | 0.80 | *1 | 10 | 8 | 52.5 | — | $10^6$< | 0.65 | 3.8 |
| 4 | 0.74 | *1 | 7 | 5 | 18 | 30 | 1-10 | 0.87 | *1 | 14 | 20 | 215 | — | $10^6$< | 0.64 | 3.7 |
| 5 | 0.86 | *1 | 10 | 18 | 122.5 | — | $10^6$< | 0.75 | *1 | 5 | 8 | 15 | — | $10^6$< | 0.65 | 3.7 |
| 6 | 0.87 | *1 | 14 | 20 | 214.5 | — | $10^6$< | 0.65 | *1 | 10 | 3 | 17.5 | 30 | 1-10 | 0.57 | 3.4 |
| 7 | 0.70 | *1 | 14 | 2 | 16.5 | 30 | 1-10 | 0.80 | *1 | 10 | 8 | 52.5 | 30 | 1-10 | 0.56 | 3.3 |
| 8 | 0.80 | *1 | 10 | 8 | 52.5 | — | $10^6$< | 0.65 | *1 | 10 | 3 | 17.5 | — | $10^6$< | 0.52 | 3.3 |
| 9 | 0.79 | *1 | 5 | 12 | 23 | — | $10^6$< | 0.70 | *1 | 14 | 2 | 16.5 | — | $10^6$< | 0.55 | 3.1 |
| 10 | 0.59 | *1 | 14 | 1.5 | 11 | 30 | 1-10 | 0.83 | *1 | 10 | 12 | 80.5 | — | $10^6$< | 0.49 | 3.0 |
| 11 | 0.70 | *1 | 12 | 2 | 13.5 | — | $10^6$< | 0.65 | *1 | 10 | 3 | 17.5 | — | $10^6$< | 0.46 | 3.0 |
| 12 | 0.55 | *1 | 10 | 2 | 10.5 | — | $10^6$< | 0.86 | *1 | 14 | 18 | 193 | — | $10^6$< | 0.47 | 2.8 |
| 13 | 0.70 | *1 | 14 | 2 | 16.5 | 30 | 1-10 | 0.65 | *1 | 10 | 3 | 17.5 | 30 | 1-10 | 0.46 | 2.8 |
| 14 | 0.86 | *1 | 14 | 18 | 192.5 | — | $10^6$< | 0.52 | *1 | 14 | 1.1 | 6.6 | — | $10^6$< | 0.45 | 2.7 |
| 15 | 0.70 | *1 | 12 | 2 | 13.5 | — | $10^6$< | 0.62 | *1 | 10 | 2.5 | 14 | — | $10^6$< | 0.43 | 2.6 |

Note:
kind of additive (*1: carbon black)
Value P = [(amount of carbon black added) − 3] × [Y (coating thickness) − 0.5]

TABLE 5

| | Surface side | | | | | | | Back side | | | | | | | | Thermal radiation |
|---|---|---|---|---|---|---|---|---|---|---|---|---|---|---|---|---|
| | Emis- | Additive | | Y | Value | | Electric con- | Emis- | Additive | | Y | Value | Ni | Electric con- | | property |
| No. | sivity a | kind | Amount % | μm | P | Ni % | ductivity Ω | sivity a | Kind | Amount % | μm | P | % | ductivity Ω | a × b | ΔT1(° C.) |
| 16 | 0.12 | None | None | 1 | | — | $10^{2-3}$ | 0.81 | *1 | 7 | 12 | 46.0 | 30 | 1-10 | 0.10 | 1.5 |
| 17 | 0.80 | *1 | 10 | 8 | 52.5 | 30 | 1-10 | 0.10 | None | None | 0.5 | | — | 0.1-1 | 0.08 | 1.5 |
| 18 | 0.70 | *1 | 14 | 2 | 16.5 | 30 | 1-10 | 0.04 | Not coated | | | | — | 0.01-0.1 | 0.03 | 1.3 |
| 19 | 0.75 | *1 | 10 | 2 | 20.5 | — | $10^6$< | 0.45 | Not coated | | | | — | 0.01-0.1 | 0.34 | 1.0 |
| 20 | 0.04 | Not coated | | | | — | 0.01-0.1 | 0.70 | *1 | 14 | 2 | 16.5 | — | $10^6$< | 0.03 | 1.3 |
| 21 | 0.12 | None | None | 1 | | — | $10^{2-3}$ | 0.12 | None | None | 1 | | — | $10^{2-3}$ | 0.01 | 0.5 |
| 22 | 0.04 | Not coated | | | | — | 0.01-0.1 | 0.04 | Not coated | | | | — | 0.01-0.1 | 0.002 | 0 (standard) |
| 23 | 0.80 | *2 | 60 | 25 | | — | $10^6$< | 0.84 | *1 | 14 | 12 | 127 | — | $10^6$< | 0.67 | 4.0 |
| 24 | 0.81 | *2 + *3 | 50 + 5 | 25 | | — | $10^6$< | 0.80 | *1 | 10 | 8 | 52.5 | 30 | 1-10 | 0.65 | 3.8 |
| 25 | 0.86 | *1 + *5 | 50 + 0.5 | 20 | | — | $10^6$< | 0.75 | *1 | 5 | 8 | 15.0 | 30 | 1-10 | 0.65 | 3.7 |
| 26 | 0.85 | *4 | 10 | 20 | | — | $10^6$< | 0.80 | *1 | 10 | 8 | 52.5 | 30 | 1-10 | 0.52 | 3.4 |
| 27 | 0.86 | *1 + *5 | 14 | 18 | | — | $10^6$< | 0.86 | *1 | 14 | 18 | 193 | — | $10^6$< | 0.74 | 4.1 |
| 28 | 0.86 | *1 + *5 | 14 | 18 | | — | $10^6$< | 0.86 | *1 | 14 | 18 | 193 | — | $10^6$< | 0.74 | 4.1 |
| 29 | 0.80 | *2 | 60 | 25 | | — | $10^6$< | 0.04 | Not coated | | | | — | 0.01-0.1 | 0.03 | 1.4 |
| 30 | 0.80 | *2 | 60 | 25 | | — | $10^6$< | 0.10 | None | None | 0.5 | | — | 0.1-1 | 0.08 | 1.5 |

Note:
kind of additive (*1: carbon black, *2: titanium oxide, *3: iron oxide, *4: Al flake, *5; acrylic beads)
Value P = [(amount of carbon black added) − 3] x [Y (coating thickness) − 0.5]
Used as a substrate were a blackened Zn—Ni alloy coated steel plate for No. 19, an Al plate for No. 26 and a Cu plate for No. 27.

From Tables 4 and 5, it has been found that coated bodies satisfying the requirements of the present invention (Nos. 1 to 15 in Table 4 and Nos. 23 to 28 in Table 5) each has good thermal radiation property and the greater the product (a×b in Tables) of emissivities, the better the thermal radiation property. The coated bodies having a coating added with Ni (Nos. 2, 4, 6-7, 10 and 13 in Table 4 and Nos. 16 to 18 and 24 to 26 in Table 5) are excellent also in electric conductivity.

Of these, Nos. 23 to 26 in Table 5 are samples having a thermal radiative coating formed by adding carbon black to the back side of the substrate, while adding an additive other than carbon black to the surface side (No. 23 is a sample added with only titanium oxide; No. 24 a sample added with titanium oxide and iron oxide as a mixture; No. 25 a sample added with carbon black and acrylic beads as a mixture; and No. 26 a sample added with only Al flake). Since they satisfy the requirements of the present invention, they exhibit excellent thermal radiation property.

The coated bodies (Nos. 16 to 22, 29 to 30 in Table 5) which do not satisfy the requirement of the present invention are all inferior in thermal radiation property. In particular, Samples Nos. 18 to 20 and 29 in Table 5 having a coating only on one side do not have desired thermal radiation property.

In the below-described Example 5, various properties, mainly thermal radiation property and self cooling property, of the second and third coated bodies of the present invention are evaluated.

Example 5

Evaluation of Thermal Radiation Property and Electric Conductivity of the Second and Third Coated Bodies As in Example 1, the thermal radiation property and electric conductivity of samples were measured while using various additives or changing emissivity from the surface side and back side of a substrate. At the same time, self cooling property was evaluated as described above.

Described specifically, Samples Nos. 1 to 19 having the composition as shown in Table 6 were used in this Example. Of these, Sample No. 17 used as the substrate a blackened Zn—Ni alloy coated steel sheet (thickness: 0.6 mm) and the other samples used as a substrate an electro galvanized steel plate (thickness: 0.6 mm). In every sample, as in Example 1, a polyester resin and a melamine resin were employed as the base resin and the crosslinking agent, respectively. Baking and drying were carried out as in Example 1, whereby each sample (120×150 mm) was prepared.

The $\Delta T_i$ which expresses thermal radiation property was subjected to relative evaluation based on the below-described criteria. In the second coated body according to the present invention, those ranked as A, B and C are regarded as "coated bodies having good thermal radiation property".

A: $3.5 \leq \Delta T1$
B: $2.7 \leq \Delta T1 < 3.5$
C: $1.5 \leq \Delta T1 < 2.7$
D: $1.0 \leq \Delta T1 < 1.5$
E: $\Delta T1 < 1.0$ $\Delta T2$ which expresses self cooling property was subjected to relative evaluation based on the below-described criteria. The greater $\Delta T2$, the better thermal radiation property. In the second coated body according to the present invention, the coated bodies ranked as A and B are evaluated as "those exhibiting excellent self cooling property".

A: $1.5 \leq \Delta T2$
B: $0.5 \leq \Delta T2 < 1.5$
C: $\Delta T2 < 0.5$

The results are shown in Tables 6 and 7.

TABLE 6

| | Surface side | | | | | | | Back side | | | | | |
|---|---|---|---|---|---|---|---|---|---|---|---|---|---|
| | | Additive | | | | | | | Additive | | | | |
| No. | Emissivity a | Kind | Amount % | Y μm | Value P | Ni % | Electric conductivity Ω | Emissivity a | Kind | Amount % | Y μm | Value P | Ni % | Electric conductivity Ω |
| 1 | 0.86 | *1 | 14 | 18 | 192.5 | — | $10^6<$ | 0.23 | *1 | 14 | 0.2 | -3.3 | 30 | 1-10 |
| 2 | 0.87 | *1 | 14 | 20 | 214.5 | — | $10^6<$ | 0.35 | *1 | 10 | 1.4 | 6.3 | 30 | 1-10 |
| 3 | 0.68 | *1 | 10 | 3.5 | 21 | 30 | 1-10 | 0.27 | None | None | 2.5 | | — | $10^6<$ |
| 4 | 0.70 | *1 | 14 | 2 | 16.5 | 30 | 1-10 | 0.38 | *1 | 10 | 1.5 | 7 | 30 | 1-10 |
| 5 | 0.86 | *1 | 14 | 18 | 192.5 | — | $10^6<$ | 0.52 | *1 | 14 | 1.1 | 6.6 | 30 | 1-10 |
| 6 | 0.79 | *1 | 5 | 12 | 23 | — | $10^6<$ | 0.48 | *2 | 50 | 3 | 118 | — | $10^6<$ |
| 7 | 0.62 | *1 | 10 | 2.5 | 14 | 30 | 1-10 | 0.35 | None | None | 3 | | — | $10^6<$ |
| 8 | 0.84 | *1 | 14 | 12 | 126.5 | — | $10^6<$ | 0.55 | *1 | 10 | 2 | 10.5 | 30 | 1-10 |
| 9 | 0.86 | *1 | 14 | 18 | 192.5 | — | $10^6<$ | 0.65 | *1 | 10 | 3 | 17.5 | 30 | 1-10 |
| 10 | 0.65 | *4 | 10 | 20 | 136.5 | — | $10^6<$ | 0.50 | *4 | 10 | 4 | 24.5 | — | $10^6<$ |
| 11 | 0.48 | *4 | 10 | 6 | 38.5 | — | $10^6<$ | 0.36 | *1 | 1 | 1.8 | -2.6 | 30 | 1-10 |
| 12 | 0.80 | *2 | 60 | 25 | 139.7 | — | $10^6<$ | 0.65 | *1 | 5 | 3.5 | 6 | 30 | 1-10 |
| 13 | 0.68 | *1 | 10 | 3.5 | 21 | — | $10^6<$ | 0.04 | Not coated | | | | — | 0.01-0.1 |
| 14 | 0.40 | *1 | 1 | 2 | -3 | — | $10^6<$ | 0.24 | None | None | 2 | | — | $10^6<$ |
| 15 | 0.12 | None | None | 1 | | 30 | 1-10 | 0.12 | None | None | 1 | | 30 | 1-10 |
| 16 | 0.83 | *1 | 10 | 12 | 80.5 | — | $10^6<$ | 0.81 | *1 | 7 | 12 | 46 | — | $10^6<$ |
| 17 | 0.43 | Blackened | | | | — | 0.01-0.1 | 0.45 | Blackened | | | | — | 0.01-0.1 |
| 18 | 0.73 | *1 | 7 | 5 | 18 | 30 | 1-10 | 0.81 | *1 | 14 | 8 | | — | $10^6<$ |
| 19 | 0.04 | Not coated | | | | — | 0.01-0.1 | 0.04 | Not coated | | | | — | 0.01-0.1 |

Note:
kind of additive (*1: carbon black, *2: titanium oxide, *3: iron oxide, *4: Al flake, *5; acrylic beads)
Value P = [(amount of carbon black added) − 3] × [Y (coating thickness) − 0.5]
As a substrate, No. 19 used a blackened Zn—Ni alloy coated steel plate.

TABLE 7

| | Emissivity | | Value Q | Value R | Self cooling property | | Thermal radiation property | |
|---|---|---|---|---|---|---|---|---|
| No. | surface side a | back side b | 0.9a − b | (a − 0.05) × (b − 0.05) | ΔT2 °C. | Relative evaluation | ΔT1 °C. | Relative evaluation |
| 1 | 0.86 | 0.23 | 0.54 | 0.15 | 2.5 | A | 1.7 | B |
| 2 | 0.87 | 0.35 | 0.43 | 0.25 | 2.3 | A | 2.0 | B |
| 3 | 0.68 | 0.27 | 0.34 | 0.14 | 2.0 | A | 1.6 | B |
| 4 | 0.70 | 0.38 | 0.25 | 0.21 | 1.9 | A | 1.8 | B |
| 5 | 0.86 | 0.52 | 0.25 | 0.38 | 1.8 | A | 2.7 | A |
| 6 | 0.79 | 0.48 | 0.23 | 0.32 | 1.6 | A | 2.2 | B |
| 7 | 0.62 | 0.35 | 0.21 | 0.17 | 1.6 | A | 1.7 | B |
| 8 | 0.84 | 0.55 | 0.21 | 0.40 | 1.5 | A | 2.8 | A |
| 9 | 0.86 | 0.65 | 0.12 | 0.49 | 1.1 | B | 3.4 | A |
| 10 | 0.65 | 0.50 | 0.09 | 0.27 | 0.7 | B | 2.0 | B |

TABLE 7-continued

| | Emissivity | | | | Self cooling property | | Thermal radiation property | |
|---|---|---|---|---|---|---|---|---|
| No. | surface side a | back side b | Value Q 0.9a − b | Value R (a − 0.05) × (b − 0.05) | ΔT2 °C. | Relative evaluation | ΔT1 °C. | Relative evaluation |
| 11 | 0.48 | 0.36 | 0.07 | 0.13 | 0.8 | B | 1.7 | B |
| 12 | 0.80 | 0.65 | 0.07 | 0.45 | 0.7 | B | 3.1 | A |
| 13 | 0.68 | 0.04 | 0.57 | −0.01 | 2.5 | A | 1.2 | C |
| 14 | 0.40 | 0.24 | 0.12 | 0.07 | 1.5 | A | 1.3 | C |
| 15 | 0.12 | 0.12 | −0.01 | 0.005 | 0 | C | 0.5 | C |
| 16 | 0.83 | 0.81 | −0.06 | 0.59 | 0.1 | C | 4.0 | A |
| 17 | 0.43 | 0.45 | −0.06 | 0.15 | 0 | C | 1.9 | B |
| 18 | 0.73 | 0.81 | −0.15 | 0.52 | 0.2 | C | 3.3 | A |
| 19 | 0.04 | 0.04 | −0.004 | 0.000 | 0 (standard) | C | 0 (standard) | C |

From the above-described table, the coated bodies (Nos. 1 to 12) satisfying the requirement of the present invention exhibit excellent self cooling property while maintaining good thermal radiation property. Samples Nos. 1 to 8 which have, in the equation (4) serving as an index of the self cooling property, Value Q (0.9a−b) much greater than 0.045 exhibit excellent self cooling property. It can be understood that the greater the value Q, the better self cooling property.

The coated bodies (Nos. 1 to 5, 7 to 9 and 11 to 12) having a coating added with Ni are also excellent in electric conductivity.

Of the samples shown in Table 6, Nos. 3 to 7 are samples having a substrate coated, on the surface side thereof, with a carbon-black-containing coating and, on the back side, with an additive-free coating; Nos. 6 and 12 are samples having a substrate coated, at the surface side and back side thereof, with a carbon-black-containing coating, respectively and, on the back side and surface side, a titanium-oxide-containing coating, respectively; No. 10 is a sample having a substrate coated, on the surface side and back side thereof, with a coating with metal finish; and No. 11 is a sample having a substrate coated, at the surface thereof, with an Al-flake-containing coating and a back side with a carbon-black-containing coating. Since any of these samples satisfies the requirements of the present invention, it has excellent self cooling property and good thermal radiation property.

Nos. 1 and 11 in Table 6 are samples having a substrate coated, on the back side, thereof, with a carbon-black-containing coating. Although it does not satisfy the above-described equation (6), it is good in both self cooling property and thermal radiation property, because it satisfies the indices [equations (4) and (5)] defined in the second coated body.

Coated bodies (Nos. 13 to 19) which do not satisfy the requirements of the present invention are each inferior in self cooling property.

For example, Sample No. 13 is a coated body having, on one side, no coating and it therefore lacks in thermal radiation property which is essential in the present invention. Similarly, the surface (coating containing carbon black) composition of Sample No. 14 satisfies neither the above-described equation (6) and therefore, nor the equation (5) serving as an index of thermal radiation property so that desired thermal radiation property is not available. Also in the case of Sample No. 15, the thickness of the coatings on both sides is thin because no additive is added thereto so that desired thermal radiation property is not available.

No. 16 is a sample which is similar in emissivity from both sides and desired self cooling property is not available. No. 17 is a conventional example having both sides blackened in a similar manner. The emissivities from the surface side and back side are on the same level so that desired self cooling property is not available. No. 18 is a sample having an emissivity greater than on the back side than on the surface side and therefore has reduced self cooling property.

In the following Example 6, the chromate-free coated body according to the present invention is investigated mainly from the viewpoints of corrosion resistance, adhesion of coating, formability and electric conductivity.

Example 6

Evaluation of Corrosion Resistance Adhesion of Coating, Formability and Electric Conductivity of a Chromate-Free Coated Body In this Example, evaluated were the above-described various properties of a coated body having, formed on both sides of a substrate subjected to chromate-free surface treatment, thermal radiative coatings of the same thickness.

Described specifically, an electrogalvanized steel sheet (sheet thickness: 0.8 mm, Zn deposition amount on one side: 20 g/m$^2$) used as a substrate was subjected to chromate-free surface treatment with "Surf Coat EC2000 (Si deposition amount: 50 mg/m$^2$)" (product of Nippon Paint). After forming a thermal radiative coating on both sides of the resulting substrate by applying a coating component [base resin, crosslinking agent, and antirust agent (a 8:2 (weight ratio) mixture of aluminum tripolyphosphate and calcium ion exchanged silicate was used)] and optionally, Ni flakes (having a thickness of 1 μm and width of from 15 to 20 μm) to both sides in equal amounts, the thermal radiative coating was baked and dried, whereby a sample No. 23 (120×150 mm) (without transparent coating) shown in Table 8 was prepared. At the same time, after the application of the above-described coating components, a transparent polyester resin was applied, followed by baking and drying, whereby samples Nos. 1 to 22 (120×150 mm) (with transparent coating) were prepared. In all of these samples, the thermal radiative coating has a thickness of 8 μm and the transparent coating has a thickness of 1 μm. The sample No. 21 is an example to which a conductive filler Ni has not been added.

Each of these samples thus obtained was evaluated for thermal radiation property and electric conductivity in similar manners to those employed in Example 1 and for fingerprint resistance and scratch resistance in similar manners to those employed in Example 3. Corrosion resistance, adhesion of coating and formability were evaluated based on the below-described criteria.

[Corrosion Resistance]

Each sample was subjected to the salt spray test for 72 hours or 120 hours in accordance with JIS-Z-2371 and an area ratio of a deteriorated portion (rust and/or swelling) formed in the coating of the flat part was measured after each test hours. The material with an area ratio of a deteriorated portion not greater than 10% as a result of the measurement is regarded as the "invention example"

[Formability (the Number of Cracks)]

Each sample is cut into a piece of 50×50 mm and bend adhesion (OT bend) is conducted by a flexural test in accordance with JIS K 5400. The cracks at the bent portion are observed using the photograph of a videoscope (magnification: 25×) and the number of cracks is counted. More specifically, the number of cracks having a major axis of 0.1 mm or greater existing in the vision of 3 mm in width is counted and the average of the number of cracks in 10 visions in total is evaluated as "the number of cracks". The sample showing "the number of cracks" not greater than 5 as a result of the measurement is regarded as the "invention example".

[Formability (Adhesion of Coating)]

After the above-described bend adhesion test, the bent portion is taped and the adhesion of coating is evaluated in accordance with the below-described criteria, depending on the peeling degree of the coating after the tape is peeled. A portion (40 mm width) to be evaluated is the sample eliminated at both ends, each by 5 mm in width.

A: no peeling

B: slight peeling (within 3 peelings of the coating in the evaluated area)

C: many peelings (at least 4 peelings of the coating in the evaluated area).

The results are shown in Table 8.

[Table 8]

From the above table, it has been confirmed that the above-described samples each has good thermal radiation property and materials Nos. 1 to 22 with a transparent coating have excellent fingerprint resistance and scratch resistance (no description in the table).

(19)

The coated bodies (Nos. 2 to 5, 7 to 14, 16 to 17, 21 to 23) satisfying the requirements of the present invention are each excellent in corrosion resistance, adhesion of coating and formability. Of these coated bodies, coated bodies containing a melamine crosslinking agent and an isocyanate crosslinking agent at a predetermined ratio are far superior in the above-described properties to the coated bodies (Nos. 8 and 9) using the single crosslinking agent singly. The coated bodies having a transparent coating formed over a thermal radiation layer (the coated bodies other than No. 23) have excellent corrosion resistance. The coated body No. 8 is an example containing a melamine crosslinking agent singly (amount: 5.5 wt. %) and having a transparent coating. It has however been confirmed by the test that the coated body has excellent corrosion resistance [an area ratio of the deteriorated portion in the salt spray test for testing corrosion resistance (120 hours) is less than 1%] even without addition of a transparent coating (not shown in the table).

The coated bodies with Ni as a conductive filler (the above-described coated bodies other than No. 21) have good electric conductivity.

The coated bodies (Nos. 1, 6, 15, 18 to 20) which do not satisfy the requirements of the present invention have the following inconveniences.

The coated body No. 1 without an antirust agent is inferior in corrosion resistance.

The coated body No. 6 containing a smaller amount of a resin is low in the adhesion of coating and formability.

In the coated bodies Nos. 15, 18 and 19, the content of the melamine crosslinking agent is higher than that of the isocyanate crosslinking agent (meaning that the content of the isocyanate crosslinking agent is smaller) and each of them has many cracks and is inferior in formability. The coated body No. 19 having a particularly high content of the melamine crosslinking agent cannot attain a sufficient formability which will otherwise be brought by the addition of the isocyanate crosslinking agent, forms many cracks and is low in the adhesion of coating.

The coated body No. 20 using a polyester resin is low in the corrosion resistance and adhesion of coating.

The foregoing invention has been described in terms of preferred embodiments. However, those skilled, in the art will recognize that many variations of such embodiments exist. Such variations are intended to be within the scope of the present invention and the appended claims.

What is claimed is:

1. A coated body for the members of an electronic device, which comprises a substrate covered, on the surface side and back side thereof, with respective thermal radiative coatings each having thermal radiation property, wherein integrated emissivities at infrared waves (wavelength: 4.5 to 15.4 μm) when the coated body is heated to 100° C. satisfy the following equation (1)

$$a \times b \geq 0.42 \tag{1}$$

wherein, a: infrared integrated emissivity from the surface side of the substrate covered with one of said respective thermal radiative coatings, and b: infrared integrated emissivity from the back side of the substrate covered with the other one of said respective thermal radiative coatings.

2. A coated body of claim 1, wherein a difference (A−B) between the maximum value A and the minimum value B of a spectral emissivity in the wavelength range of 4.5 to 15.4 μm is 0.35 or less.

3. A coated body for the members of an electronic device, which comprises a substrate covered, on the surface side and back side thereof, with respective thermal radiative coatings each having thermal radiation property, wherein:

at least one of said respective thermal radiative coatings contains a blackening additive; and at the same time, satisfies the following equation (2):

$$(X-3) \times (Y-0.5) \geq 15 \tag{2}$$

wherein,

X represents the content (mass %) of the blackening additive contained in the thermal radiative coating, and Y represents thickness (μm) of the coating.

4. A coated body of claim 3, wherein at least one of said respective thermal radiative coatings contains a conductive filler.

5. A coated body of claim 3, wherein at least one of said respective thermal radiative coatings has an electrical resistance of 100Ω or less.

6. A coated body of claim 3, further satisfying the following equation (3):

$$4 \leq X < 15 \tag{3}$$

wherein,

X represents the content (mass %) of the blackening additive contained in the thermal radiative coating.

7. A coated body of claim 3, wherein the thickness (Y) of the coating satisfies the following equation: Y>1 μm.

8. A coated body of claim 3, wherein the blackening additive has an average particle size of 5 to 100 nm.

9. A coated body of claim 3, wherein said blackening additive is carbon black.

10. A coated body of claim 3, wherein a resin forming said thermal radiative coating is a non-hydrophilic resin.

11. A coated body of claim 10, wherein said non-hydrophilic resin is a polyester resin.

12. A coated body of claim 4, wherein said conductive filler is Ni.

13. The coated body of claim 3, wherein a thermal radiative coating is covered with a transparent coating.

14. A coated body of claim 3, wherein the substrate is a metal sheet subjected to chromate-free surface treatment and the thermal radiative coating contains an antirust agent further.

15. A coated body of claim 3, wherein the thermal radiative coating has a thickness of 2 μm or greater.

16. A coated body of claim 3, which satisfies the requirement for the number of cracks not greater than 5 in the bend adhesion test according to JIS K 5400.

17. A coated body of claim 3, which satisfies the requirement for the area ratio of a deteriorated portion not greater than 10% in the salt spray test for testing corrosion resistance (72 hours) according to JIS-Z-2371.

18. A coated body of claim 3, which has another coating formed on the thermal radiative coating and satisfies the requirement for the area ratio of a deteriorated portion not greater than 10% in the salt spray test for testing corrosion resistance (120 hours) according to JIS-Z-2371.

19. A part for an electronic device having, in a closed space thereof, a heating element, which comprises a cabinet wall made wholly or partially of a coated body for members of an electronic device as claimed in claim 3.

20. A coated body for the members of an electronic device, which comprises a substrate covered, on the surface side and back side thereof, with respective coatings, at least said coating on the surface side of the substrate being a thermal radiative coating having thermal radiation property, wherein:

integrated emissivities at infrared waves (wavelength: 4.5 to 15.4 μm) when the body is heated at 100° C. satisfy the following equations (4) and (5):

$$b \leq 0.9(a-0.05) \tag{4}$$

$$(a-0.05) \times (b-0.05) \geq 0.08 \tag{5}$$

in which, a: infrared integrated emissivity from the surface side of the substrate covered with said thermal radiative coating, and b: infrared integrated emissivity from the back side of the substrate covered with the coating.

21. A coated body for the members of an electronic device, which comprises a substrate covered, on the surface side and back side thereof, with respective coatings, at least said coating on the surface side of the substrate being a thermal radiative coating having thermal radiation property, wherein:

said thermal radiative coating contains a blackening additive and satisfies the following equation (6):

$$(X-3) \times (Y-0.5) \geq 3 \tag{6}$$

wherein,

X represents the content (mass %) of the blackening additive contained in the thermal radiative coating, and Y represents thickness (μm) of the thermal radiative coating.

22. A coated body of claim 21, wherein at least one of said respective thermal radiative coatings contains a conductive filler.

23. A coated body of claim 21, wherein at least one of said respective thermal radiative coatings has an electrical resistance of 100Ω or less.

24. A coated body of claim 21, further satisfying the following equation (7):

$$4 \leq X < 15 \tag{7}$$

wherein,

X represents the content (mass %) of the blackening additive contained in the thermal radiative coating.

25. A coated body of claim 21, wherein the thickness (Y) of the thermal radiative coating satisfies the following equation: Y>1 μm.

26. A coated body of claim 21, wherein the blackening additive has an average particle size of 5 to 100 nm.

27. A coated body of claim 21, wherein said blackening additive is carbon black.

28. A coated body of claim 21, wherein a resin forming said thermal radiative coating is a non-hydrophilic resin.

29. A coated body of claim 28, wherein said non-hydrophilic resin is a polyester resin.

30. A coated body of claim 22, wherein said conductive filler is Ni.

31. A coated body of claim 21, which is improved in scratch resistance and fingerprint resistance by covering said thermal radiative coating with a transparent coating.

32. A coated body of claim 21, wherein the substrate is a metal sheet subjected to chromate-free surface treatment and the thermal radiative coating contains an antirust agent further.

33. A coated body of claim 21, wherein the thermal radiative coating has a thickness of 2 μm or greater.

34. A coated body of claim 21, which satisfies the requirement for the number of cracks not greater than 5 in the bend adhesion test according to JIS K 5400.

35. A coated body of claim 21, which satisfies the requirement for the area ratio of a deteriorated portion not greater than 10% in the salt spray test for testing corrosion resistance (72 hours) according to JIS-Z-2371.

36. A coated body of claim 21, which has another coating formed on the thermal radiative coating and satisfies the requirement for the area ratio of a deteriorated portion not greater than 10% in the salt spray test for testing corrosion resistance (120 hours) according to JIS-Z-2371.

37. A part for an electronic device having, in a closed space thereof, a heating element, which comprises a cabinet wall made wholly or partially of a coated body for members of an electronic device as claimed in claim 21.

* * * * *

UNITED STATES PATENT AND TRADEMARK OFFICE
CERTIFICATE OF CORRECTION

| | |
|---|---|
| PATENT NO. | : 7,279,218 B2 |
| APPLICATION NO. | : 10/762460 |
| DATED | : October 9, 2007 |
| INVENTOR(S) | : Watase et al. |

It is certified that error appears in the above-identified patent and that said Letters Patent is hereby corrected as shown below:

On the title page, Item (73), the Assignee should read:

-- (73) Assignee: Kabushiki Kaisha Kobe Seiko Sho (Kobe Steel, Ltd.,)
Kobe-shi, (JP) --

Signed and Sealed this

Eleventh Day of December, 2007

JON W. DUDAS
*Director of the United States Patent and Trademark Office*